(12) United States Patent
Iverson et al.

(10) Patent No.: US 9,691,178 B2
(45) Date of Patent: Jun. 27, 2017

(54) SCANNING AND PROCESSING OBJECTS INTO THREE-DIMENSIONAL MESH MODELS

(71) Applicant: Microsoft Technology Licensing, LLC, Redmond, WA (US)

(72) Inventors: Kris Iverson, Redmond, WA (US); Zheng Wang, Seattle, WA (US); Vladimir Sisolak, Bratislava (SK); Chris White, Seattle, WA (US)

(73) Assignee: Microsoft Technology Licensing, LLC, Redmund, WA (US)

( * ) Notice: Subject to any disclaimer, the term of this patent is extended or adjusted under 35 U.S.C. 154(b) by 42 days.

(21) Appl. No.: 14/590,599

(22) Filed: Jan. 6, 2015

(65) Prior Publication Data

US 2016/0110917 A1 Apr. 21, 2016

Related U.S. Application Data

(60) Provisional application No. 62/066,824, filed on Oct. 21, 2014.

(51) Int. Cl.
*G06T 17/20* (2006.01)
*G06T 19/20* (2011.01)

(52) U.S. Cl.
CPC ............ *G06T 17/205* (2013.01); *G06T 19/20* (2013.01); *G06T 2219/2012* (2013.01); *G06T 2219/2021* (2013.01)

(58) Field of Classification Search
None
See application file for complete search history.

(56) References Cited

U.S. PATENT DOCUMENTS

| 6,108,006 | A | * | 8/2000 | Hoppe | G06T 17/20 345/420 |
|---|---|---|---|---|---|
| 6,377,865 | B1 | | 4/2002 | Edelsbrunner et al. | |
| 7,277,572 | B2 | | 10/2007 | MacInnes et al. | |
| 8,212,837 | B1 | * | 7/2012 | Chernett | H04N 5/23238 345/600 |
| 8,363,907 | B2 | * | 1/2013 | Hassebrook | G01B 11/2513 345/585 |
| 8,837,026 | B2 | | 9/2014 | Fisker et al. | |
| 8,837,815 | B2 | | 9/2014 | Kerbiriou et al. | |
| 8,884,949 | B1 | * | 11/2014 | Lambert | G06K 9/00369 345/419 |
| 2001/0052123 | A1 | * | 12/2001 | Kawai | H04H 20/91 725/36 |
| 2004/0109004 | A1 | * | 6/2004 | Bastos | G06T 15/405 345/587 |
| 2008/0033442 | A1 | * | 2/2008 | Amiot | A61B 5/1077 606/80 |
| 2008/0243305 | A1 | * | 10/2008 | Lee | B25J 9/1602 700/246 |

(Continued)

*Primary Examiner* — Maurice L McDowell, Jr.
(74) *Attorney, Agent, or Firm* — International IP Law Group, PLLC

(57) ABSTRACT

The claimed subject matter includes techniques for scanning and processing three-dimensional (3D) objects. An example method includes scanning the 3D object to produce depth data. The method also includes generating, via a processor, a 3D progressive mesh from the depth data. The method further includes displaying the generation of the 3D progressive mesh in real-time.

21 Claims, 10 Drawing Sheets

(56) References Cited

U.S. PATENT DOCUMENTS

| | | | |
|---|---|---|---|
| 2009/0109282 A1* | 4/2009 | Schnebly | G02B 27/2242 348/55 |
| 2011/0105821 A1* | 5/2011 | Dieter | A61N 5/1043 600/1 |
| 2011/0299750 A1* | 12/2011 | Cool | G06T 7/0067 382/131 |
| 2012/0235988 A1* | 9/2012 | Karafin | H04N 13/026 345/419 |
| 2013/0016097 A1* | 1/2013 | Coene | G06T 15/205 345/419 |
| 2013/0083064 A1* | 4/2013 | Geisner | G06F 17/30047 345/633 |
| 2013/0187916 A1* | 7/2013 | Toy | G06T 17/205 345/420 |
| 2013/0222385 A1* | 8/2013 | Dorsey | G06T 11/20 345/427 |
| 2014/0257549 A1 | 9/2014 | Swartz et al. | |
| 2014/0288699 A1 | 9/2014 | Williams et al. | |

* cited by examiner

500

SCANNING AND PROCESSING OBJECTS INTO THREE-DIMENSIONAL MESH MODELS

CROSS-REFERENCE TO RELATED APPLICATION

The present application claims the benefit of U.S. Provisional Patent Application Ser. No. 62/066,824 by Iverson, et al., which is titled "Scanning and Modeling 3D Objects with Real-time Preview" and was filed Oct. 21, 2014, the disclosure of which is incorporated herein by this reference as though fully set forth herein.

BACKGROUND

Three-dimensional (3D) objects may be scanned in various ways, including moving the scanner or the object, or using progressive capture to create a full 360 degree scan. 3D scans typically result in large amounts of depth data such as point cloud representations that are detailed and result in large file sizes when stored in memory or on disk. 3D scans are then typically processed into a 3D mesh before being manipulated by traditional 3D modeling (CAD) tools. A 3D printer can then print various 3D objects based on the digital representation of the object, referred to herein as a 3D model or a 3D mesh.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

An implementation provides a system for scanning and processing a three-dimensional (3D) object. The system includes a first module to scan the 3D object to produce depth data. The system also includes a second module to generate a 3D progressive mesh from the depth data, the generation of the 3D progressive mesh to be displayed in real-time.

Another implementation provides method for scanning and processing a three-dimensional (3D) object. The method can include scanning the 3D object to produce depth data. The method may also include generating, via a processor, a 3D progressive mesh from the depth data. Further, the method may include displaying the generation of the 3D progressive mesh in real-time.

Another implementation provides one or more computer-readable storage medium for storing computer readable instructions that, when executed by one or more processing devices, instruct the scanning and processing of a 3D object. The computer-readable medium include instructions to scan the 3D object to produce depth data. The computer-readable medium also include instructions to generate, via a processor, a 3D progressive mesh from the depth data. The computer-readable medium include instructions to display the generation of the 3D progressive mesh in real-time. Further, the computer-readable medium include instructions to print the 3D object.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

This disclosure describes techniques to improve 3D modeling efficiency, including improvements to the scanning of 3D objects, the collection of scan data, the size of 3D progressive meshes, and the repair of 3D progressive meshes. In some examples, the techniques described herein improve the efficiency of scanning and processing 3D objects. The present techniques provide the ability to reduce the size of the 3D models in order to improve use of memory and processing speed, the ability to improve color accuracy, and the ability to quickly generate meshes with true volumes. A true volume as used herein has a definite closed volume. The present techniques also provide the ability for consumers to easily simplify 3D models resulting from scans. The present techniques also provide the ability to improve the collection of data. These techniques are described in more detail below. Moreover, the results of the scanning and processing can be displayed in real-time. Thus, time and resources may be saved by identifying and fixing inefficiencies and inaccuracies in the 3D progressive meshes earlier.

Figure 1:
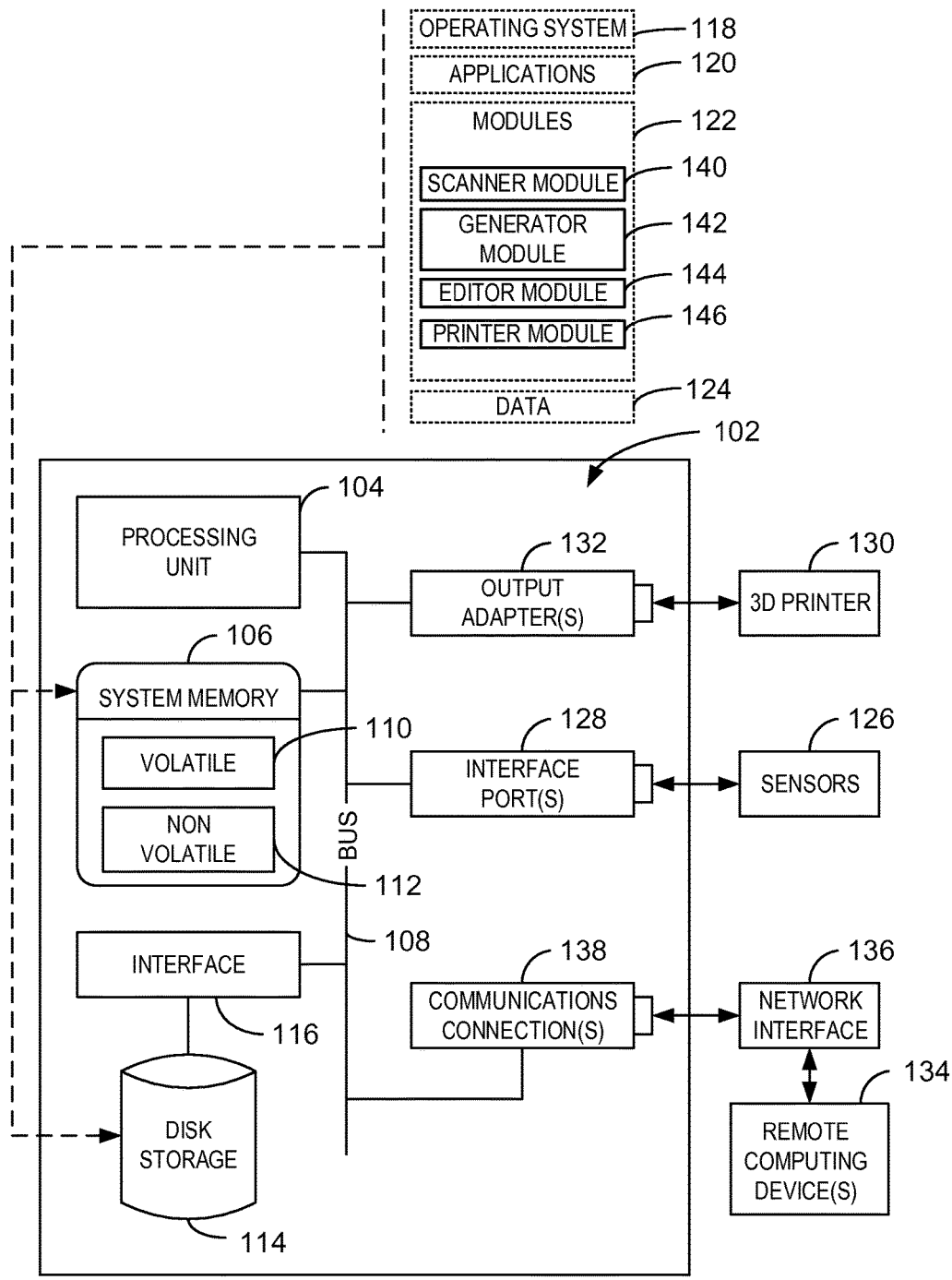
FIG. 1 is a block diagram of an example operating environment configured for implementing various aspects of the techniques described herein.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may include communication media such as transmission media for wireless signals and the like.

FIG. 1 is intended to provide a brief, general description of a computing environment in which the various techniques described herein may be implemented. For example, a method and system for scanning a 3D object and processing a 3D model to be used for fabricating 3D objects can be implemented in such a computing environment. While the claimed subject matter has been described above in the general context of computer-executable instructions of a computer program that runs on a local computer or remote computer, the claimed subject matter also may be implemented in combination with other program modules. Generally, program modules include routines, programs, components, data structures, or the like that perform particular tasks or implement particular abstract data types.

FIG. 1 is a block diagram of an example operating environment configured for implementing various aspects of the techniques described herein. The example operating environment 100 includes a computer 102. The computer 102 includes a processing unit 104, a system memory 106, and a system bus 108.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

The basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/non-volatile computer storage media. FIG. 1 shows, for example a disk storage 114. Disk storage 114 includes, but is not limited to, devices like a magnetic disk drive, floppy disk drive, tape drive, Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through program modules 122 and program data 124 stored either in system memory 106 or on disk storage 114. It is to be appreciated that the claimed subject matter can be implemented with various operating systems or combinations of operating systems.

A user can input scan information into the computer 102 through sensors 126. Sensors 126 can include, but are not limited to, a depth sensor, camera, scanner, a digital camera, a digital video camera, a web camera, and the like. For example, the sensors 126 can be those found inside a depth camera such as the Kinect® sensor. The sensors 126 connect to the processing unit 104 through the system bus 108 via interface ports 128. Interface ports 128 include, for example, a serial port, a parallel port, a game port, and a universal serial bus (USB).

Three-dimensional (3D) printer 130 can use some of the same type of ports as sensors 126. Thus, for example, a USB port may be used to provide input to the computer 102, and to output information from computer 102 to a 3D printer 130.

Output adapter 132 is provided to illustrate that 3D printer 130 may be accessible via adapters. The output adapters 132 include any cards that can provide a means of connection between the 3D printer 130 and the system bus 108. It can be noted that other devices and systems of devices can provide both input and output capabilities such as remote computers 134.

The computer 102 can be a server hosting various software applications in a networked environment using logical connections to one or more remote computers, such as remote computers 134. The remote computers 134 may be client systems configured with web browsers, PC applications, mobile phone applications, and the like. The remote computers 134 can be a personal computer, a server, a router, a network PC, a workstation, a microprocessor based appliance, a mobile phone, a peer device or other common network node and the like, and typically includes many or all of the elements described relative to the computer 102.

Remote computers 134 can be logically connected to the computer 102 through a network interface 136 and then connected via a communication connection 138, which may be wireless. Network interface 136 encompasses wireless communication networks such as local-volume networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

An example processing unit 104 for the server may be a computing cluster. The disk storage 114 may comprise an enterprise data storage system, for example, holding thousands of impressions. The computer 102 can be configured to instruct a printer to fabricate a 3D object. The data 124 may include one or more 3D models, which may be obtained or constructed from information obtain from sensors 126, for example. In some examples, the 3D model is a mesh model.

One or more of applications 120 may be configured to enable a user to scan an object and generate and customize a 3D model for later fabrication as an object. The user may not generate the 3D model as the application 120 may automate this process or adapt a 3D model ultimately obtained from sensors 126 or remote computing device 134 via a network interface 136.

The generator module 142 can generate the 3D model in response to receiving a user instruction using software such as 3D computer aided design (CAD) software such as 3D builder. The generator module 142 may then store the 3D model, for example to disk storage 114, or send the 3D model to a fabricator, such as the fabricator 200 describe below in relation to FIG. 2. The computations executed by the computer 102 to generate the 3D model are described further below in relation to FIG. 3.

In addition, or alternatively, one or more modules 122 can be configured to perform scanning and processing of 3D objects. A scanner module 140 can scan the 3D object to produce depth data. A generator module 142 can generate a 3D progressive mesh from the depth data, the generation of the 3D progressive mesh to be displayed in real-time. In some examples, an editor module 144 can improve color accuracy during the generation of the 3D progressive mesh by filtering noises in the depth data and removing inaccurate color artifacts associated with the noises. In some examples, the editor module 144 can detect a threshold complexity of the 3D progressive mesh based on a number of triangles or vertices display a simplification tool to simplify the 3D progressive mesh. In some examples, the editor module 144 can simplify the 3D progressive mesh by removing small particles. In some examples, the editor module 144 can transform a vertex color detected from the 3D progressive mesh into a graphical texture file. In some examples, the printer module 146 can print the resulting simplified 3D progressive mesh. For example, the 3D progressive mesh can be simplified by any of the above methods, among others.

In some examples, some or all of the processes performed for generating the mesh can be performed in a cloud service and reloaded on the client computer of the user. For example, some or all of the applications 120 or the modules 122 described for the 3D model generation and modification can be executed in a cloud service and can receive input from a user through a client computer 102. Thus, the computations involved in computing the 3D model can be performed on a cloud computing system. These computations can include removing small disconnected particles, simplifying the 3D mesh or smoothing the overall 3D mesh, transforming vertex colors into graphical texture files, improving color accuracy, removing portions of a mesh, or manifold detection. In other examples, a computer can receive a user request for the printing of a 3D object and forward the request to a cloud service. The cloud service can then retrieve the 3D model from a remote computer and return printing instructions to a 3D printer 130. The printer may be local to the user or remote and later retrieved by the user. In other examples, the generator module 142 may generate the 3D model locally based on techniques herein described and submit the generated model to a cloud service which processes the 3D model based on techniques herein described, and return printing instructions to a printer. In some examples, the generator module 142 may generate the 3D model locally based on the techniques described herein and the printer module 146 can print the model on a locally attached 3D printer 130.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional modules, additional memory devices, additional network interfaces, etc.). Furthermore, any of the functionalities of the scanner module 140, the generator module 142, the editor module 144, and the printer module 146, can be partially, or entirely, implemented in hardware and/or in a processor. For example, the functionality can be implemented with an application specific integrated circuit, in logic implemented in the processor, or in any other device. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs), etc.

Figure 2:
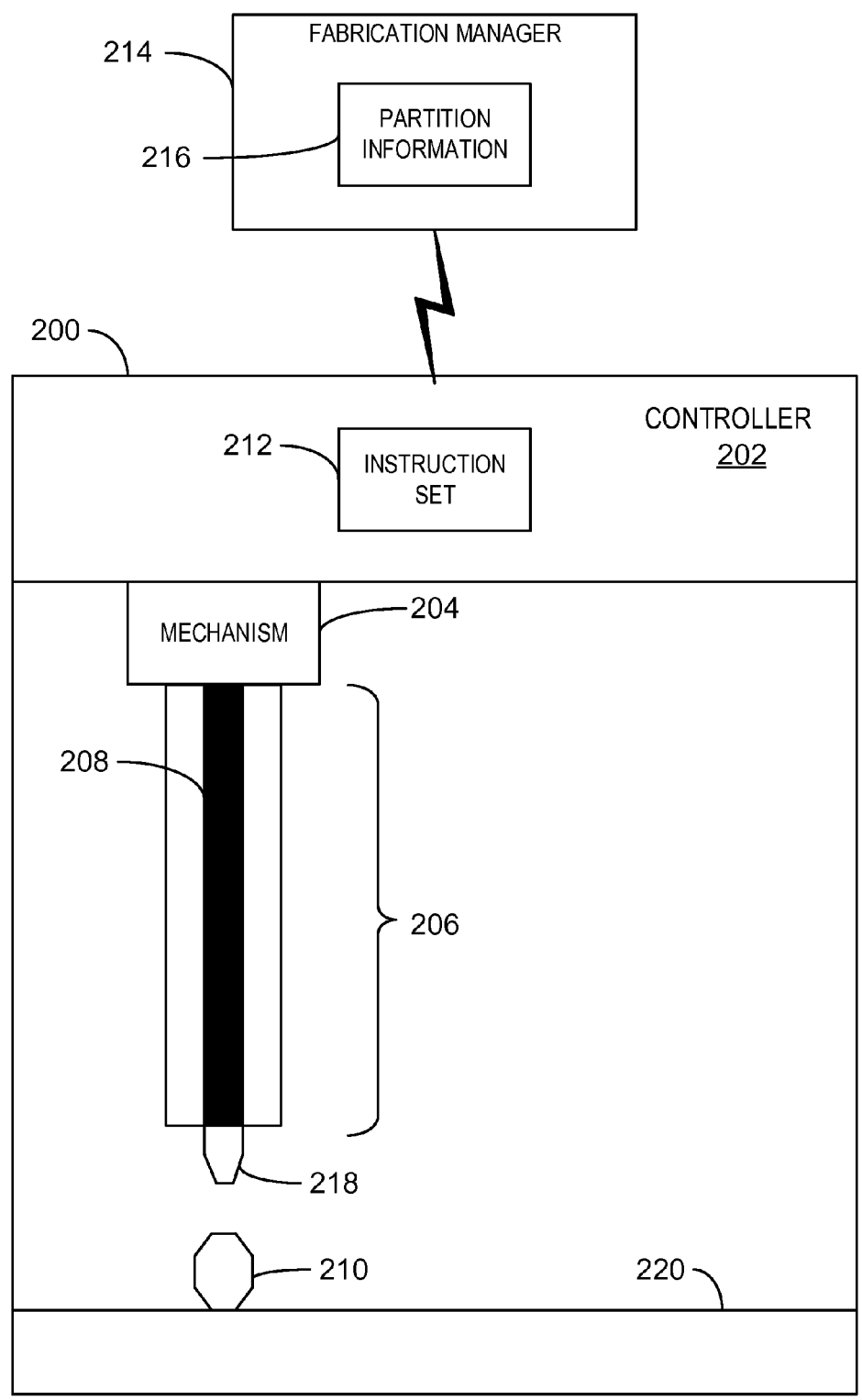
FIG. 2 is a block diagram of an example fabricator for fabricating 3D objects from a 3D model.

FIG. 2 is a block diagram of an example fabricator for fabricating a 3D object using on a 3D model. The fabricator 200 may include a control unit or controller 202 coupled to a first mechanism 204 and configured to execute instructions for the first mechanism 204 and a second mechanism 206. A chamber 208 constructed within the second mechanism 206 allows materials to be prepared, e.g., heated and blended, when fabricating an object 210. For example, the chamber 208 is used for melting and extruding filaments or other compatible materials.

The first mechanism 204 may be referred to as a robotic mechanism, e.g., a gantry robot, including various mechanical or electro-mechanical components. By executing at least some instructions within an instruction set 212, the first mechanism 204 may actuate these components into performing at least some physical movement. The fabrication manager 214 may generate the instruction set 212 by partitioning a 3D model into layers and providing specific fabrication instructions for each layer. When actuated, these components may move horizontally, vertically, diagonally, rotationally, and so forth. One example implementation of the first mechanism 204 moves a printing mechanism or tool across an x, y, or z-axis in order to deposit material at a specific position within the object 210 being fabricated.

The second mechanism 206 may be referred to as a printing mechanism that includes one or more printing tool heads. The material may be pushed or pulled into a printing tool head, and the motors may be mounted further away from the printing tool head in order to push the material through a thin guide tube into the chamber 208. Although the second mechanism 206 may resemble an extruder configuration, e.g., a single extruder head configuration, it is appreciated that the second mechanism 206 represents any compatible technology, including legacy printing tool heads configured to deposit various types of materials.

Instructions stored in an instruction set 212 may be collectively referred to as coordinated instructions because such instructions are executed, in coordination with multiple components. For example, instructions for different stepper motors in an extruder configuration may be coordinated such that an appropriate extrudable material is fed into the chamber 208. A stepper motor may reside in mechanism 204 and control the height of a nozzle 218 relative to a platform 220 as described below. Accordingly, an instruction for one stepper motor may be synchronized in time with an instruction for another stepper motor such that both stepper motors can operate in coordination with each other.

The fabrication manager 214 may include hardware and software components operating on various implementations of computing devices, such as a remote computing device and an attached computing device. One example implementation of the fabrication manager 214 processes a 3D model corresponding to an object being fabricated and partitions that information into layers in which each layer includes at least some geometry, which may include geometric elements corresponding to a surface mesh. The present disclosure may use "partition", "slice", or another similar term in place of "layer," and it is appreciated that these terms be defined as interchangeable.

Within partition information 216, the fabrication manager 214 stores a data structure corresponding to the 3D model indicating a geometry of a 3d object to be printed or rendered. Geometry generally refers to a set of geometric elements, such as a 3D polyhedron or other shape, which may represent an amount of extrudable material to be deposited. One example measure represents at least a portion of the geometry—and therefore, the amount of extrudable material—volumetrically. The example measure may define a portion of the geometry using standardized units in which each unit represents a minimal amount, e.g., volume, of colored material at a given time instance, such as by an extrusion width. Each geometric element may include one or more standardized units.

The fabrication manager 214 is configured to generate instructions that, when executed by the controller 202, actuate components of the first mechanism 204, which may result in movements of the second mechanism 206 following a surface geometry, e.g., an exterior shell of the object 210. Optionally, a movable platform, such as a platform 220, functions as a mechanism for printing the object 210. The first mechanism 204 may operate the platform 220 to guide the object 210 and the nozzle 218 to each other. The instruction set 212 may include instructions for automatically calibrating the platform 220 such that through a series of movements in an x, y, and z direction or in rotation across an x-y plane, the 3D object 210 is moved to a correct position for the nozzle 218 to deposit material.

Some example implementations of the fabricator 200 include legacy devices that are retrofitted with at least some of the components described herein, including the controller 202, the fabrication manager 214, and a printing tool head, such as the second mechanism 206. As one option, the fabricator 200 may include an additional microprocessor to manage the set of motors located in the first mechanism 204 for guiding the nozzle 218 and to receive a signal from a microprocessor when a command is processed.

To illustrate one example, a verified manifold object, represented in a 3D mesh model, may be partitioned into layers by processing each polygon representing the object, and projecting each polygon through a slicing plane. A manifold object can include any object with an enclosed, orientable surface area. This projection generates a point and connections to other points in a manner that eventually creates a path. From this point, the path is reduced to units, e.g., volumetric measures of geometric elements, representing addressable units for a specific hardware characteristic of a corresponding fabricator. The units may not be the same size, consistent within each axis, or the same scale in each axis or dimension. For example, a dimension can be an x, y, or z dimension. One example implementation may utilize non-cubic units of different sizes along an x, y, or z axis, which enables different effective resolutions per dimension.

According to an example implementation, the partition information 216 may include voxelized data such that each addressable (voxel) unit includes a variety of information, such as color, texture, and lighting values, for a geometry within that addressable voxel unit.

An example fabricator 200 includes an arrangement of motors and a tool head having a mixing chamber and a nozzle. The tool head also may include a heating element for melting extrudable material to a prescribed or predetermined temperature. When fabricating the 3D object, the fabrication manager 214 determines an approximate amount of extrudable material capable of being deposited at a given (x, y, z) location. The fabrication manager 214 uses the determined amount to define addressable units on the object's shell. Each unit represents a specific geometric element or a portion of the 3D object. The addressable units may be represented herein as voxelized data, e.g., voxelized data structure. In an example implementation, the fabrication manager 214 determines volume in voxel units, e.g., volumetric pixels. The fabricator's 3D space is factored by a minimum volume of extrudable material. Other information may include implicit values, such as, distance to an object surface mesh, or probabilities indicating whether a voxel unit of the object occupies the volume represented, and the like. This technique may be applied to the object's entire volume, including the outer shell.

Figure 3:
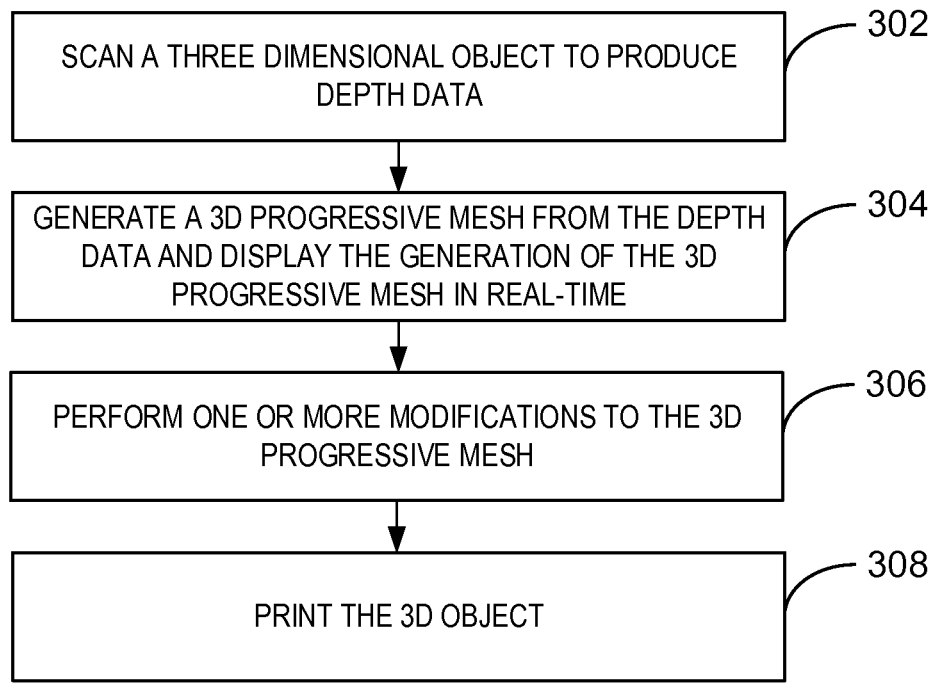
FIG. 3 shows a process flow diagram of a method for scanning and processing a 3D objects.

FIG. 3 shows a process flow diagram of a method for scanning and processing 3D objects. The method 300 can be implemented with any suitable computing device, such as computing device 102 of FIG. 1.

At block 302, the scanner module 140 scans a 3D object to produce depth data. In some examples, a variety of techniques may be employed during the scan to improve performance. For example, a capture volume size can be modified, a timer for capture can be specified to make data collection easier, and wireless mouse buttons can be configured to control capture while a user is standing away from the computing device, each discussed in greater detail with respect to FIG. 4 below.

At block 304, the generator module 142 generates a 3D progressive mesh from the depth data and displays the generation of the 3D progressive mesh in real-time. For example, a user may view the scanning of the 3D object and application of techniques described below as they are being processed. In some examples, techniques for improving the resulting 3D progressive mesh can be executed during the 3D progressive mesh generation. For example, color accuracy can be improved by filtering noises in depth capture first and then sampling the color texture of the scanned object based on the filtered depth map. This algorithm will be discussed at greater length in reference to FIG. 5 below. In some examples, the techniques described herein can be used to repair the 3D progressive mesh during the generation of the 3D progressive mesh.

At block 306, the editor module 144 performs one or more modifications to the 3D progressive mesh. For example, the modifications to the 3D progressive mesh can include user-aided operations such as simplifying the mesh, smoothing the mesh, or removing a section of the mesh using a cutting tool. The modifications can also include automated operations such as manifold detection for detecting invalid models, or a mechanism for repairing the mesh by filling in the mesh where appropriate. The modifications can also include hybrid mechanisms that detect the complexity of a 3D mesh model and suggest appropriate simplification operations.

At block 308, the printer module 146 prints a 3D object. For example, the 3D object can be printed by the example printer 200 of FIG. 2 using the 3D progressive mesh. In some examples, the 3D object can be printed by extruding material to form layers. The layers can then be combined to form a 3D object.

This process flow diagram is not intended to indicate that the blocks of the method 300 are to be executed in any particular order, or that all of the blocks are to be included in every case. Further, any number of additional blocks not shown may be included within the method 300, depending on the details of the specific implementation.

Figure 4:
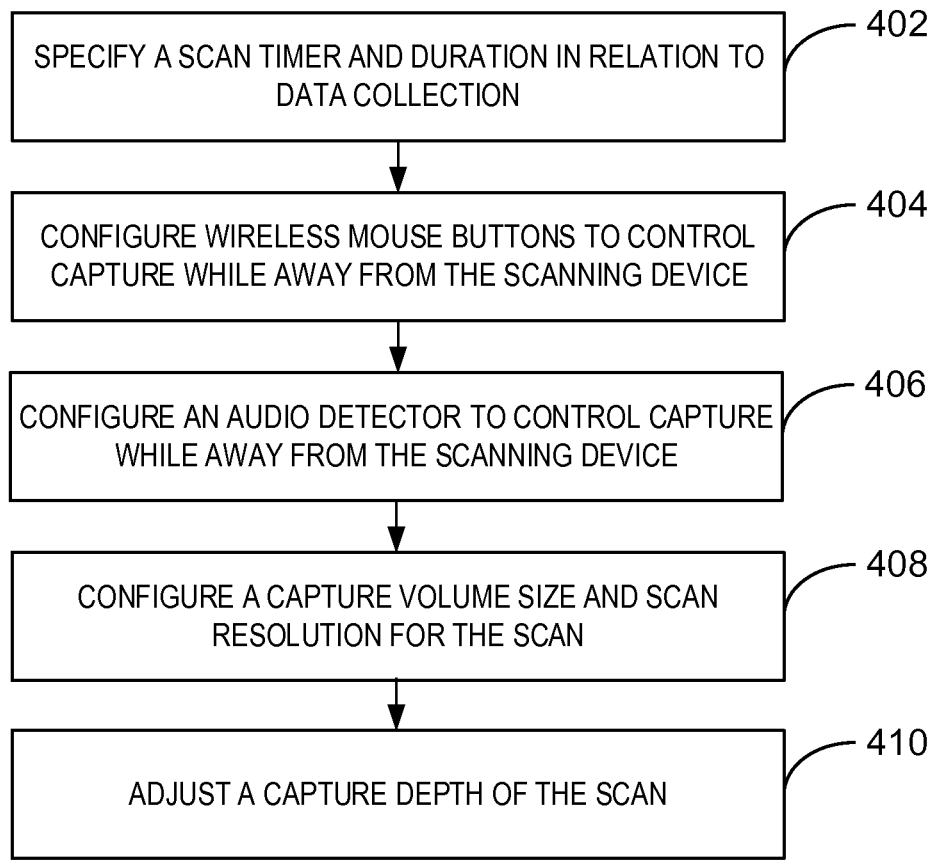
FIG. 4 shows a process flow diagram of a method for scanning 3D objects.

FIG. 4 shows a process flow diagram of a method for scanning a 3D object. The method 400 can be implemented with any suitable computing device, such as computing device 102 of FIG. 1.

At block 402, a scan timer and duration is specified in relation to data collection. For example, a scan can be taken of a user. The timer can be set to a specified time and the user placed into the capture volume to be scanned. In some examples, this timer can be configured to any time or set at predetermined intervals. In some examples, a duration for the scan can also be set such that the user or any other object can be rotated to obtain a full 360 degree scan.

At block 404, wireless mouse buttons are configured to control capture while away from the scanning device. For example, users can scan themselves by holding a wireless mouse and clicking a button while standing in the capture depth of the scan. In some examples, a single click can begin a scan and a second click can stop a scan. For example, a user may click a mouse button once to begin a scan, rotate around, and then click the mouse button a second time to finish the scan.

At block 406, an audio detector to control capture while away from the scanning device is configured. For example, an audible phrase can be configured to begin a scan while standing in the depth capture volume. Another audible phrase can be configured to stop the scan.

At block 408, a capture volume size and scan resolution are configured. For example, the capture volume size can be related to a resolution of the capture. In some examples, a larger volume can be scanned at a lower resolution such that less details are captured. In some examples, a smaller volume can be scanned at a higher resolution such that more fine details are captured. In some examples, the resolution and the capture volume size can be independently adjusted. For example, a small volume can be captured at a low resolution to decrease the size of the resulting 3D mesh.

At block 410, a capture depth of the scan is adjusted. For example, a scan may have a capture depth that corresponds to a volume in which depth data is captured. Objects outside this capture depth will not be recorded as data and included in the 3D mesh. Therefore, the resulting 3D mesh size can be reduced by reducing the amount of material scanned by the sensors 126. The capture depth is also discussed in greater detail with respect to FIGS. 7, 8A, and 8B below.

This process flow diagram is not intended to indicate that the blocks of the method 400 are to be executed in any particular order, or that all of the blocks are to be included in every case. Further, any number of additional blocks not shown may be included within the method 400, depending on the details of the specific implementation.

Figure 5:
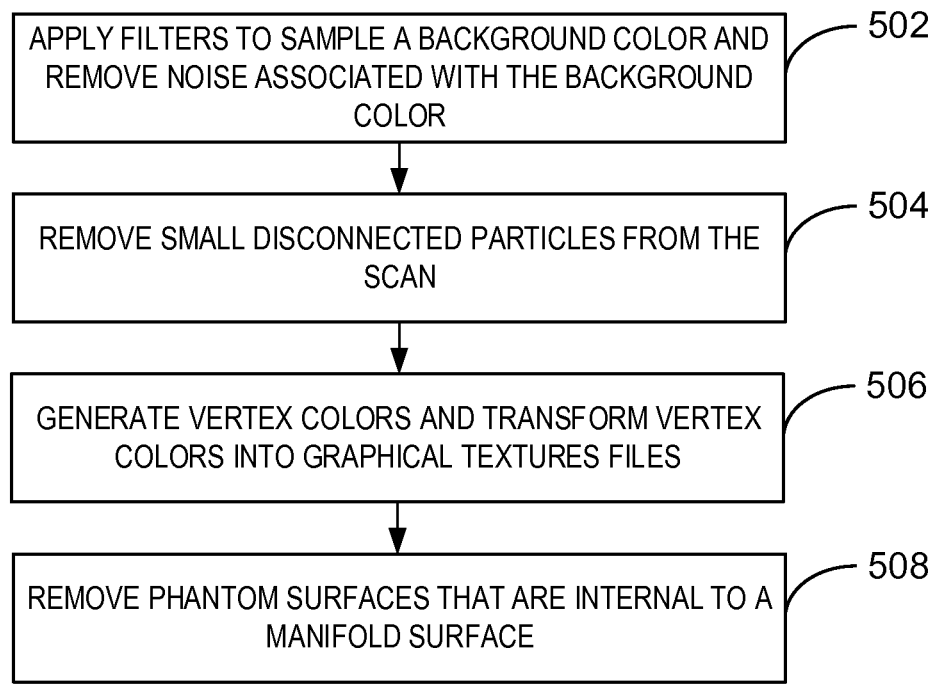
FIG. 5 shows a process flow diagram of a method for processing 3D objects.

FIG. 5 shows a process flow diagram of a method for generating a 3D mesh of a 3D object. The method 500 can be implemented with any suitable computing device, such as computing device 102 of FIG. 1.

At block 502, the generator module 142 can apply filters to sample a background color and remove noise associated with the background color. In some examples, removing the noise can be accomplished by filtering the noises in captured depth data and then resampling the color based on the filtered depth map. A noise as used herein refers to any scan data that does not correspond to object being scanned. The depth data received from sensors 126 may contain noises around the boundary of an object, which may cause color being captured incorrectly from the background instead of the object. For example, a human can be scanned with a white wall as background. The color data can be sampled based on the depth values of the human. The white wall can be excluded from the color sampling because the distance of the white wall is outside the range of depth values of the human.

At block 504, the generator module 142 can remove small disconnected particles from the scan. The small disconnected particles may correspond to noise. Noise may be generated at surface edges of an object, such as the edges of a cube or along the boundary of a human body. Noise can also be generated as well by transparent materials or reflections. For example, sensor 126 may detect reflections from objects such as glass or metal and remove the corresponding small particles. In some examples, the generator module 142 can isolate the particles based on the depth data and remove the small particles surrounding the 3D mesh model. For example, the particles may be disconnected and at a distance from the object being modeled.

At block 506, the generator module 142 can generate vertex colors and transform the vertex colors into graphical texture files. For example, the generator module 142 can increase compatibility with some file formats, renderers, and services by transforming vertex color information into separate texture files representing the color information of an object. As used herein, a texture refers to a color look-up table with the UV coordinates of vertices as indices and the vertex colors as values. The letters "U" and "V" denote the axes of the 2D texture being mapped onto the 3D surface. In some examples, a color lookup table can be generated using the vertex colors and written out as a texture image into a graphical texture file. In some examples, the generator module 142 can allocate a texture with a predetermined amount of space based on the number of vertices of an object. In some examples, at least nine pixels can be allocated per vertex in order to avoid color interpolation issues. For example, triangles that are neighbors in 3D space may not be neighbors in the UV space which points to the texture. Furthermore, the UV space is continuous space. In some examples, the generator module 142 can prevent rendering neighbor texels in texture to a specific triangle. For example, the generator module 142 can use bilinear interpolation and also construct textures using bilinear filtering or similar techniques. The generator module 142 can may assign a UV coordinate to each vertex and paint the texture for each vertex by each vertex's appropriate color.

At block 508, the generator module 142 can remove phantom surfaces that are internal to a manifold surface. A phantom surface refers to a surface vector that is contained within a 3D mesh manifold surface. For example, a scan of an object may result in a second phantom surface below a real surface due to issues relating to reconstruction technology and depth technology. A real surface refers to a model surface that corresponds to the physical surface of an object that was scanned. The phantom surface may use system memory and resources but does not add any detail or value to the 3D mesh. In some examples, the generator module 142 can detect and remove such phantom surfaces. For example, the generator module 142 can remove the phantom surfaces during the generation of the 3D mesh.

This process flow diagram is not intended to indicate that the blocks of the method 500 are to be executed in any particular order, or that all of the blocks are to be included in every case. Further, any number of additional blocks not shown may be included within the method 500, depending on the details of the specific implementation.

Figure 6:
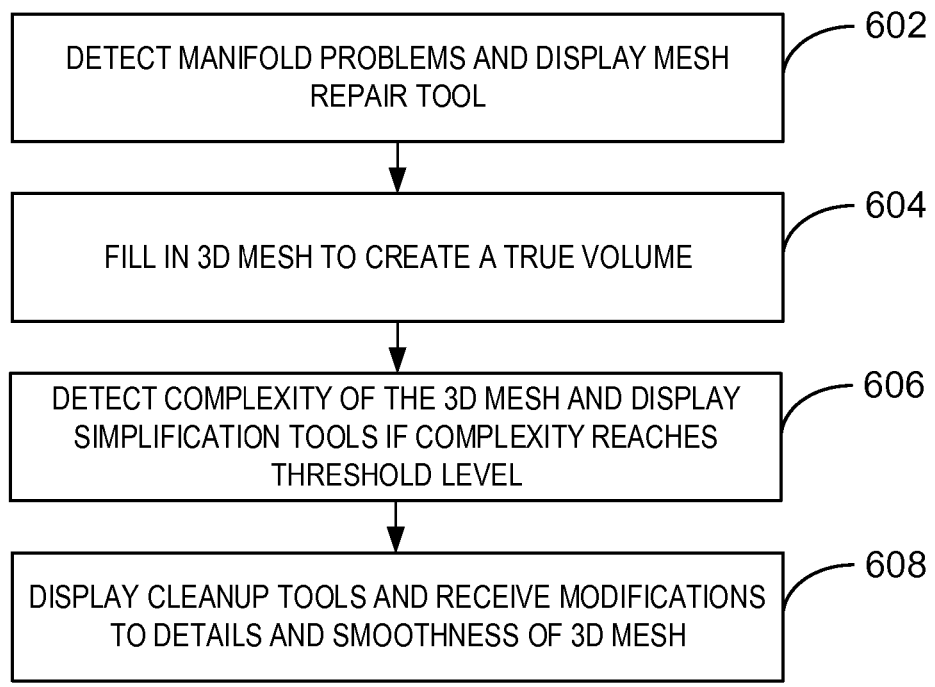
FIG. 6 shows a process flow diagram of a method for modifying a 3D mesh.

FIG. 6 shows a process flow diagram of a method for modifying a 3D mesh. The method 600 can be implemented with any suitable computing device, such as computing device 102, of FIG. 1.

At block 602, the editor module 144 can detect manifold problems and display a mesh repair tool. For example, a 3D mesh may have one or more holes in the manifold. The mesh model with such holes may be said to be or not have a true volume. In some examples, a manifold problem can be detected and an appropriate tool displayed. For example, a filler tool can be displayed on a screen to receive input. In some examples, the filler tool can receive selected holes to fill with a plane. For example, a selected hole in a 3D mesh can be filled in with a flat or a curved plane.

At block 604, the editor module 144 can fill in 3D mesh to create a true volume. A true volume may be defined as a volume with a definite number. For example, one or more holes in a mesh model may exist after a scan. Because the one or more holes exist in the mesh model, the mesh model may be said to lack a true volume or be non-manifold. In some examples, the editor module 144 can detect a non-manifold region of the 3D progressive mesh and repair the non-manifold region such that the 3D progressive mesh is manifold. The editor module 144 can automatically fill in the holes if they are below a threshold size. For example, the holes can be filled by planes or curved surfaces based on neighboring surfaces. In some examples, the holes can be highlighted for repair if they are at or above a threshold size. For example, for holes above a threshold size, a user may be provided the option of using a plane cut tool to manually cut into surfaces around the hole and produce a planar patch. A planar patch is a portion of a plane that connects edges resulting from a plane cut. In some examples, a planar patch can be curved to smoothen the edges of a plane cut.

At block 606, the editor module 144 can detect a complexity of the 3D mesh and display simplification tools if complexity reaches a threshold level. For example, a 3D mesh may be so complex as to potentially cause a computer to crash or slow down during the generation of the 3D mesh. In some examples, one or more techniques can be combined to reduce the complexity of the 3D mesh. For example, a minimum triangle size can be specified for the model and any triangles under this threshold size can be removed. Resulting holes from any removed triangles can also be repaired to keep the 3D mesh a solid volume. In some examples, small holes in the 3D mesh can also be repaired by filling the hole and recalculating simplified shapes based on the filled mesh.

At block 608, the editor module 144 can display cleanup tools and receive modifications to details and smoothness of the 3D mesh. For example, the modifications can include an increase in smoothness of the 3D mesh or a reduction of detail in the 3D mesh. In some examples, the editor module 144 can provide a notification when the complexity of a 3D mesh has reached a threshold value. For example, the threshold value can be the number of triangles or vertices of a model. In some examples, any of the simplification tools above can be presented for simplification of the 3D mesh. In some examples, the cleanup tools can include a plane cut tool. For example, the plane cut tool can be used to cut a portion of a 3D mesh using a plane to slice the object at a certain angle. In some examples, the cut portion of the 3D mesh can be automatically filled with a plane to the cut edges. For example, a plane cut can result in an object with a true volume with at least one flat edge. In some examples, the plane cut tool can be used when a scan results in an object without a true volume. For example, an object may have only been scanned from one angle and therefore not have a true volume. In some examples, the editor module 144 can modify the smoothness of a 3D model using Laplacian smoothing algorithms. For example, the editor module 144 can use Laplacian-based algorithms to average values of vertex positions neighboring a target vertex to be smoothed.

This process flow diagram is not intended to indicate that the blocks of the method 600 are to be executed in any particular order, or that all of the blocks are to be included in every case. Further, any number of additional blocks not shown may be included within the method 600, depending on the details of the specific implementation.

Figure 7:
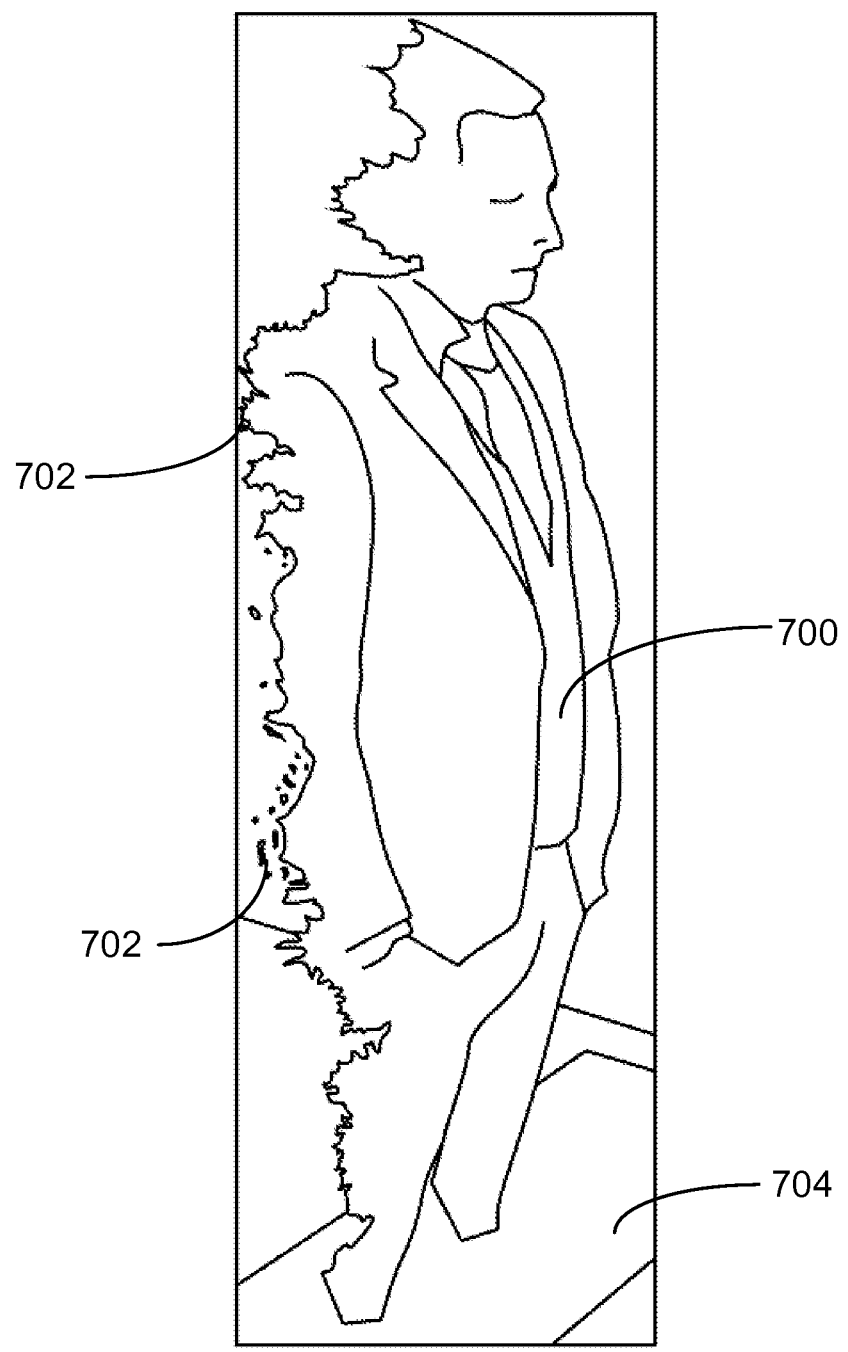
FIG. 7 shows an example 3D mesh of a person as captured from sensors.

FIG. 7 shows an example 3D mesh 700 of a person as captured from sensors. The example 3D mesh 700 includes many small particles 702. For example, the small particles 702 may be the result of an incomplete 3D scan from the front of the person. Capture depth 704 is indicated by a rectangle on the ground beneath example 3D mesh 700. In some examples, a scan may not be able to fully capture a model within a capture depth 704. This can result in a plurality of small particles 702.

Figure 8A:
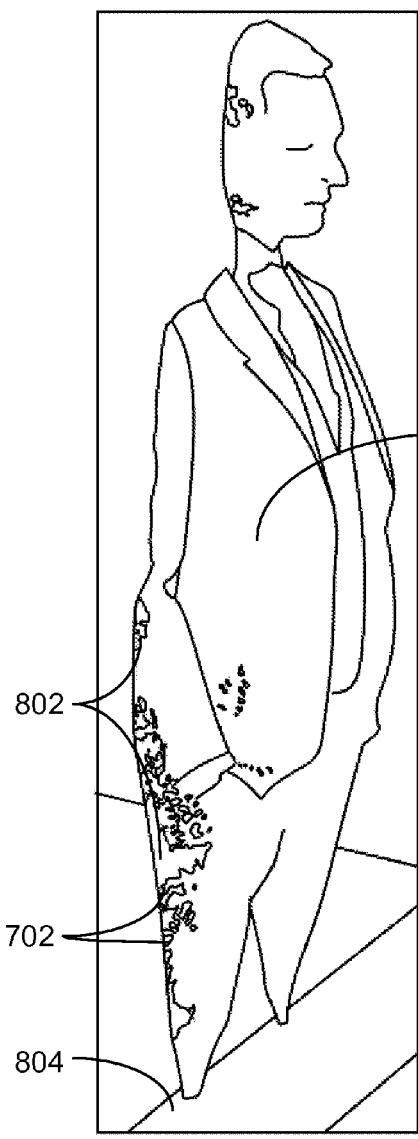
FIG. 8A shows an example 3D mesh of a person after using a plane cut tool.

FIG. 8A shows an example 3D mesh 800 of a person after using a plane cut tool. The example 3D mesh 800 has been partially filled in as a result of the plane cut tool and at the back and this back fill can be seen at holes 802. For example, the application 120 can use information from particles 702 to construct a smooth surface containing the particles 702. In some examples, the plane cut tool can be used by reducing the capture depth and removing information outside the bounds of the reduced capture depth. In the example of FIG. 8A, particles 702 outside the capture depth 804 have been removed from the example 3D mesh 800. However, as can be seen in FIG. 8A, the example mesh 800 also still includes various imperfections 702 throughout the 3D mesh and holes 802. For example, the imperfections can include color inaccuracies among other discrepancies between the 3D mesh and the scanned object.

Figure 8B:
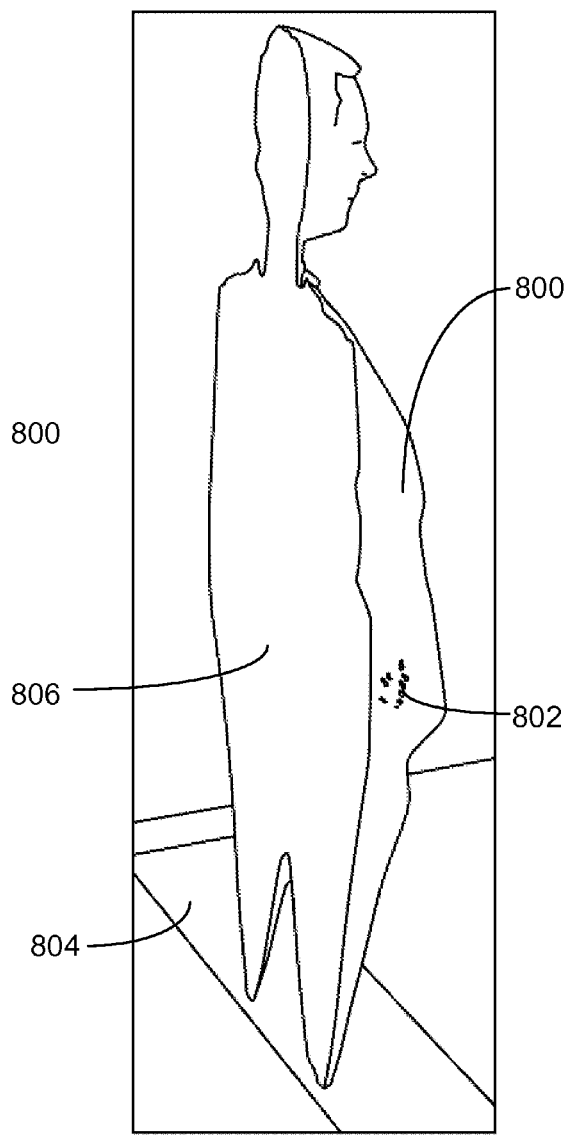
FIG. 8B shows a rear angle view of an example 3D mesh of a person after using a plane cut tool.

FIG. 8B shows a rear angle view of an example 3D mesh 800 of a person after using a plane cut tool. Example mesh 800 includes a smooth rear 806 corresponding to the cross-section created by the plane cut tool. The rear side 806 of example mesh 800 is parallel to the boundary created by capture depth 804. Holes 802 are still visible as they have not been fixed yet.

Figure 9A:
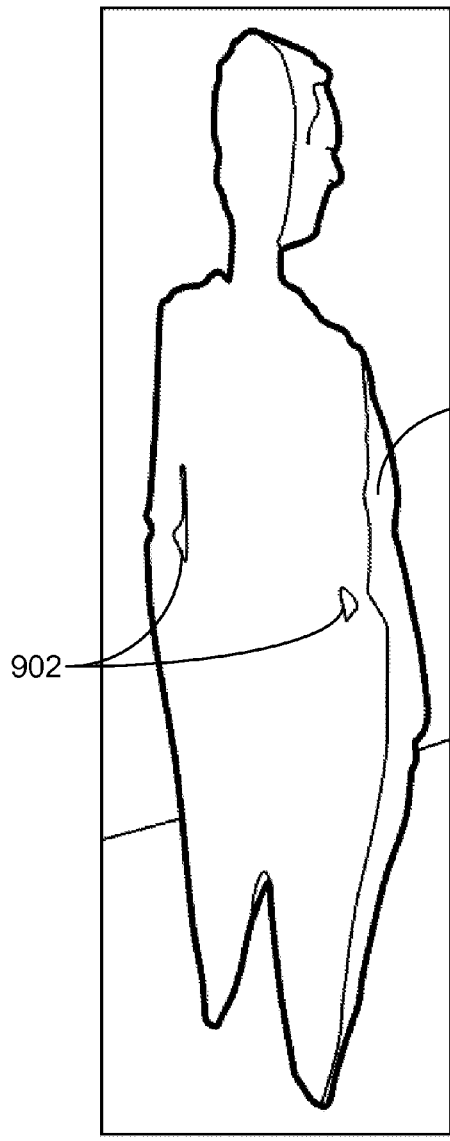
FIG. 9A shows a rear view of an example 3D mesh of a person after repair.

FIG. 9A shows a rear view of an example 3D mesh 900 of a person after repair. As can be seen in FIG. 9, repairs have been applied to prepare example 3D mesh 900 for 3D printing. For example, the holes 902 in between the person's arms have been opened up once again, where they had previously been automatically filled in by the plane cut tool. Since the automatic fill function of the plane cut tool resulted in a thin slice of material, the repair tool removed this extra slice of the 3D mesh 900.

Figure 9B:
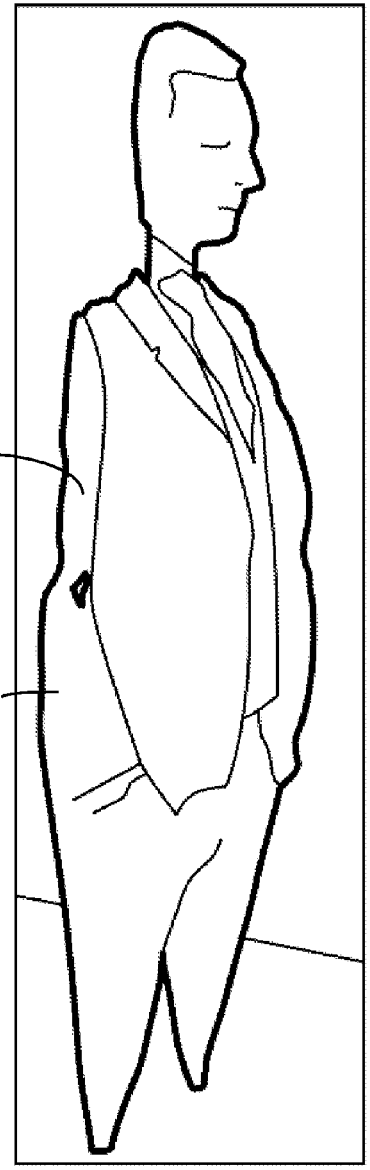
FIG. 9B shows a frontal view of an example 3D mesh of a person after repair.

FIG. 9B shows a frontal view of an example 3D mesh 900 of a person after repair. From the frontal view of FIG. 9B, it can be seen that color repairs have also been applied to the imperfections of example mesh 900. For example, holes 802 have been patched and the color of each patch was interpolated from edges of holes 802 during the repair process as can be seen in the uniform area 904. Although shades of the colors black and white are used for the purposes of example 9A and 9B, the color repairs can include any range of colors. In some examples, the color repair tool can examine the color of edges surrounding a fill and automatically color the fill with a similar color. In some examples, the color can be a gradient that includes the surrounding colors. In some examples, the colors can also include surrounding textures.

Figure 10:
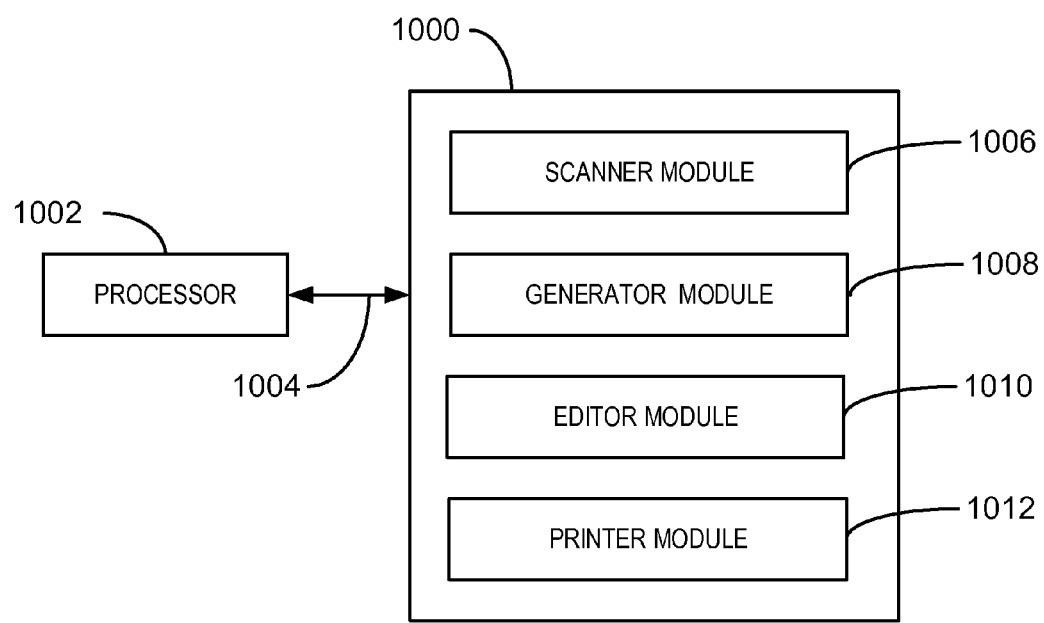
FIG. 10 is a block diagram of an example computer-readable storage medium that can be used to scan and process 3D objects.

FIG. 10 is a block diagram showing a tangible, computer-readable storage medium that can be used to scan and process 3D objects. The tangible, computer-readable storage media 1000 can be accessed by a processor 1002 over a computer bus 1004. Furthermore, the tangible, computer-readable storage media 1000 can include code to direct the processor 1002 to perform the current methods. For example, methods of FIGS. 3, 4, 5, and 6 can be performed by the processor 1002.

The various software components discussed herein can be stored on the tangible, computer-readable storage media 1000, as indicated in FIG. 10. For example, the tangible computer-readable storage media 1000 can include a scanner module 1006, a generator module 1008, an editor module 1010, and a printer module 1012. In some implementations, the scanner module 1006 includes code to scan the 3D object to produce depth data. The generator module 1008 includes code to generate, via a processor 1002, a 3D progressive mesh from the depth data. The generator module 1008 includes code to display the generation of the 3D progressive mesh in real-time. The printer module 1012 includes code to print the 3D object.

In some examples, the scanner module 1006 includes code to configure a capture volume size for scanning, the capture volume size to be smaller for a more detailed scan or larger for a less detailed scan. In some examples, the editor module 1010 includes code to transform a vertex color detected from the 3D progressive mesh into a graphical texture file. In some examples, the editor module 1010 includes code to remove a disconnected particle from the 3D progressive mesh or the depth data. In some examples, the editor module 1010 includes code to simplify the 3D progressive mesh by applying a smoothing filter. Alternatively, or in addition, the editor module 1010 can include code to remove a section of the 3D progressive mesh. Alternatively, or in addition, the editor module 1010 can include code to remove a detail of the 3D progressive mesh. In some examples, the editor module 1010 includes code to reduce background noise during scanning by adjusting a capture depth volume. In some examples, the editor module 1010 includes code to detect a threshold complexity of the 3D progressive mesh based on number of triangles or vertices. In some examples, the editor module 1010 includes code to display a simplification tool for a user to use to simplify the 3D progressive mesh.

It is to be understood that any number of additional software components not shown in FIG. 10 can be included within the tangible, computer-readable storage media 1000, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

EXAMPLE 1

This example provides for a system for scanning and processing a 3D object. The system includes a first module to scan the 3D object to produce depth data. The system also includes a second module to generate a 3D progressive mesh from the depth data. The second module also causes the display the generation of the 3D progressive mesh in real-time. Alternatively, or in addition, a third module may improve color accuracy during the generation of the 3D progressive mesh by filtering noises in the depth data and removing inaccurate color artifacts associated with the noises. Alternatively, or in addition, the third module may detect a threshold complexity of the 3D progressive mesh based on number of triangles or vertices and display a simplification tool for a user to use to simplify the 3D progressive mesh. Alternatively, or in addition, the third module may simplify the 3D progressive mesh by removing small particles. Alternatively, or in addition, the third module may transform a vertex color detected from the 3D progressive mesh into a graphical texture file. Alternatively, or in addition, the third module may repair the 3D progressive mesh during the generation of the 3D progressive mesh. Alternatively, or in addition, the third module may detect and remove a phantom surface that is internal to a manifold surface of the 3D progressive mesh.

EXAMPLE 2

This example provides for a method for scanning and processing a 3D object in color. The method can include scanning the 3D object to produce depth data. Further the method may include generating, via a processor, a 3D progressive mesh from the depth data. The method can also include displaying the generation of the 3D progressive mesh in real-time. Alternatively, or in addition, the method may include improving color accuracy during the generation of the 3D progressive mesh by filtering noises in the depth data and removing inaccurate color artifacts associated with the noises. Alternatively, or in addition, the method may include removing disconnected particles from the 3D progressive mesh or depth data. Alternatively, or in addition, the method may include simplifying the 3D progressive mesh by applying a smoothing filter. Alternatively, or in addition, the method may include simplifying the 3D progressive mesh by removing a section of the 3D progressive mesh. Alternatively, or in addition, the method may include simplifying the 3D progressive mesh by removing a detail of the 3D progressive mesh. Alternatively, or in addition, the method may include reducing background noise during scanning by adjusting a capture depth volume. Alternatively, or in addition, the method may include configuring a capture volume size for scanning, the capture volume size to be smaller for a more detailed scan or larger for a less detailed scan. Alternatively, or in addition, the method may include detecting an opening in the 3D progressive mesh and repairing the mesh such that the mesh represents a true volume. Alternatively, or in addition, the method may include detecting a non-manifold region of the 3D progressive mesh and repairing the non-manifold region such that the 3D progressive mesh is manifold. Alternatively, or in addition, the method may include repairing the 3D progressive mesh during the generation of the 3D progressive mesh. Alternatively, or in addition, the method may include detecting and removing a phantom surface that is internal to a manifold surface of the 3D progressive mesh.

EXAMPLE 3

This example provides for one or more computer-readable storage medium for storing computer readable instructions that, when executed by one or more processing devices, instruct the scanning and processing of a 3D object. The computer-readable medium include instructions to scan the 3D object to produce depth data. The computer-readable medium also include instructions to generate, via a processor, a 3D progressive mesh from the depth data. The computer-readable medium include instructions to display the generation of the 3D progressive mesh in real-time. Further, the computer-readable medium include instructions to print the 3D object. Alternatively, or in addition, the instructions may transform a vertex color detected from the 3D progressive mesh into a graphical texture file. Alternatively, or in addition, the instructions may remove disconnected particles from the 3D progressive mesh or depth data. Alternatively, or in addition, the instructions may simplify the 3D progressive mesh by applying a smoothing filter. Alternatively, or in addition, the instructions may simplify the 3D progressive mesh by removing a section of the 3D progressive mesh. Alternatively, or in addition, the instructions may simplify the 3D progressive mesh by removing a detail of the 3D progressive mesh. Alternatively, or in addition, the instructions may reduce background noise during scanning by adjusting a capture depth volume. Alternatively, or in addition, the instructions may configure a capture volume size for scanning, the capture volume size to be smaller for a more detailed scan or larger for a less detailed scan. Alternatively, or in addition, the instructions may detect a threshold complexity of the 3D progressive mesh based on number of triangles or vertices and display a simplification tool for a user to use to simplify the 3D progressive mesh. Alternatively, or in addition, the instructions may repair the 3D progressive mesh during the generation of the 3D progressive mesh. Alternatively, or in addition, the instructions may detect and remove a phantom surface that is internal to a manifold surface of the 3D progressive mesh.

EXAMPLE 4

This example provides for a system for scanning and processing a three-dimensional (3D) object in color. The system includes a processor and a system memory including code to direct the processor. When executed this code can cause the processor to scan the 3D object to produce depth data. This code may also cause the processor to generate a 3D progressive mesh from the depth data. This code can also cause the processor to display the generation of the 3D progressive mesh in real-time. The code can also cause the processor to improve color accuracy during the generation of the 3D progressive mesh by filtering noises in the depth data and removing inaccurate color artifacts associated with the noises. Alternatively, or in addition, the code may detect a threshold complexity of the 3D progressive mesh based on number of triangles or vertices and display a simplification tool for a user to use to simplify the 3D progressive mesh. Alternatively, or in addition, the code may simplify the 3D progressive mesh by removing small particles. Alternatively, or in addition, the code may transform a vertex color detected from the 3D progressive mesh into a graphical texture file. Alternatively, or in addition, the code may repair the 3D progressive mesh during the generation of the 3D progressive mesh. Alternatively, or in addition, the code may detect and remove a phantom surface that is internal to a manifold surface of the 3D progressive mesh.

EXAMPLE 5

This example provides for a system for scanning and processing a three-dimensional (3D) object in color. The system includes a processor and a system memory including code to direct the processor. When executed this code can cause the processor to scan the 3D object to produce depth data. This code may also cause the processor to generate a 3D progressive mesh from the depth data. This code can also cause the processor to display the generation of the 3D progressive mesh in real-time. This code can also cause the processor to detect a threshold complexity of the 3D progressive mesh based on number of triangles or vertices and display a simplification tool for a user to use to simplify the 3D progressive mesh. Alternatively, or in addition, the code may improve color accuracy during the generation of the 3D progressive mesh by filtering noises in the depth data and removing inaccurate color artifacts associated with the noises. Alternatively, or in addition, the code may simplify the 3D progressive mesh by removing small particles. Alternatively, or in addition, the code may transform a vertex color detected from the 3D progressive mesh into a graphical texture file. Alternatively, or in addition, the code may repair the 3D progressive mesh during the generation of the 3D progressive mesh. Alternatively, or in addition, the code may detect and remove a phantom surface that is internal to a manifold surface of the 3D progressive mesh. Alternatively, or in addition, the code may detect and remove a phantom surface that is internal to a manifold surface of the 3D progressive mesh.

EXAMPLE 6

This example provides for a system for scanning and processing a three-dimensional (3D) object in color. The system includes a processor and a system memory including code to direct the processor. When executed this code can cause the processor to scan the 3D object to produce depth data. This code may also cause the processor to generate a 3D progressive mesh from the depth data. This code can also cause the processor to display the generation of the 3D progressive mesh in real-time. This code can also cause the processor to simplify the 3D progressive mesh by removing small particles. Alternatively, or in addition, the code may improve color accuracy during the generation of the 3D progressive mesh by filtering noises in the depth data and removing inaccurate color artifacts associated with the noises. Alternatively, or in addition, the code may detect a threshold complexity of the 3D progressive mesh based on number of triangles and vertices and display a simplification tool for a user to use to simplify the 3D progressive mesh. Alternatively, or in addition, the code may transform a vertex color detected from the 3D progressive mesh into a graphical texture file. Alternatively, or in addition, the code may repair the 3D progressive mesh during the generation of the 3D progressive mesh. Alternatively, or in addition, the code may detect and remove a phantom surface that is internal to a manifold surface of the 3D progressive mesh.

EXAMPLE 7

This example provides for a system for scanning and processing a three-dimensional (3D) object in color. The system includes a processor and a system memory including code to direct the processor. When executed this code can cause the processor to scan the 3D object to produce depth data. This code may also cause the processor to generate a 3D progressive mesh from the depth data. This code can also cause the processor to display the generation of the 3D progressive mesh in real-time. This code can also cause the processor to may transform a vertex color detected from the 3D progressive mesh into a graphical texture file. Alternatively, or in addition, the code may improve color accuracy during the generation of the 3D progressive mesh by filtering noises in the depth data and removing inaccurate color artifacts associated with the noises. Alternatively, or in addition, the code may detect a threshold complexity of the 3D progressive mesh based on number of triangles or vertices and display a simplification tool for a user to use to simplify the 3D progressive mesh. Alternatively, or in addition, the code may simplify the 3D progressive mesh by removing small particles. Alternatively, or in addition, the code may repair the 3D progressive mesh during the generation of the 3D progressive mesh. Alternatively, or in addition, the code may detect and remove a phantom surface that is internal to a manifold surface of the 3D progressive mesh.

EXAMPLE 8

This example provides for a system for scanning and processing a three-dimensional (3D) object in color. The system includes a processor and a system memory including code to direct the processor. When executed this code can cause the processor to scan the 3D object to produce depth data. This code may also cause the processor to generate a 3D progressive mesh from the depth data. This code can also cause the processor to display the generation of the 3D progressive mesh in real-time. This code can also cause the processor to print the 3D object. Alternatively, or in addition, the code may improve color accuracy during the generation of the 3D progressive mesh by filtering noises in the depth data and removing inaccurate color artifacts associated with the noises. Alternatively, or in addition, the code may detect a threshold complexity of the 3D progressive mesh based on number of triangles or vertices and display a simplification tool for a user to use to simplify the 3D progressive mesh. Alternatively, or in addition, the code may simplify the 3D progressive mesh by removing small particles. Alternatively, or in addition, the code may transform a vertex color detected from the 3D progressive mesh into a graphical texture file. Alternatively, or in addition, the code may repair the 3D progressive mesh during the generation of the 3D progressive mesh. Alternatively, or in addition, the code may detect and remove a phantom surface that is internal to a manifold surface of the 3D progressive mesh.

EXAMPLE 9

This example provides for a system for scanning and processing a three-dimensional (3D) object in color. The system includes a processor and a system memory including code to direct the processor. When executed this code can cause the processor to scan the 3D object to produce depth data. This code may also cause the processor to generate a 3D progressive mesh from the depth data. This code can also cause the processor to display the generation of the 3D progressive mesh in real-time. This code can also cause the processor to remove disconnected particles from the 3D progressive mesh or depth data. Alternatively, or in addition, the code may improve color accuracy during the generation of the 3D progressive mesh by filtering noises in the depth data and removing inaccurate color artifacts associated with the noises. Alternatively, or in addition, the code may detect a threshold complexity of the 3D progressive mesh based on number of triangles or vertices and display a simplification tool for a user to use to simplify the 3D progressive mesh. Alternatively, or in addition, the code may simplify the 3D progressive mesh by removing small particles. Alternatively, or in addition, the code may transform a vertex color detected from the 3D progressive mesh into a graphical texture file. Alternatively, or in addition, the code may repair the 3D progressive mesh during the generation of the 3D progressive mesh. Alternatively, or in addition, the code may detect and remove a phantom surface that is internal to a manifold surface of the 3D progressive mesh.

EXAMPLE 10

This example provides for a system for scanning and processing a three-dimensional (3D) object in color. The system includes a processor and a system memory including code to direct the processor. When executed this code can cause the processor to scan the 3D object to produce depth data. This code may also cause the processor to generate a 3D progressive mesh from the depth data. This code can also cause the processor to display the generation of the 3D progressive mesh in real-time. This code can also cause the processor to simplify the 3D progressive mesh by applying a smoothing filter. Alternatively, or in addition, the code may improve color accuracy during the generation of the 3D progressive mesh by filtering noises in the depth data and removing inaccurate color artifacts associated with the noises. Alternatively, or in addition, the code may detect a threshold complexity of the 3D progressive mesh based on number of triangles or vertices and display a simplification tool for a user to use to simplify the 3D progressive mesh. Alternatively, or in addition, the code may simplify the 3D progressive mesh by removing small particles. Alternatively, or in addition, the code may transform a vertex color detected from the 3D progressive mesh into a graphical texture file. Alternatively, or in addition, the code may repair the 3D progressive mesh during the generation of the 3D progressive mesh. Alternatively, or in addition, the code may detect and remove a phantom surface that is internal to a manifold surface of the 3D progressive mesh.

EXAMPLE 11

This example provides for a system for scanning and processing a three-dimensional (3D) object in color. The system includes a processor and a system memory including code to direct the processor. When executed this code can cause the processor to scan the 3D object to produce depth data. This code may also cause the processor to generate a 3D progressive mesh from the depth data. This code can also cause the processor to display the generation of the 3D progressive mesh in real-time. This code can also cause the processor to simplify the 3D progressive mesh by removing a section of the 3D progressive mesh. Alternatively, or in addition, the code may improve color accuracy during the generation of the 3D progressive mesh by filtering noises in the depth data and removing inaccurate color artifacts associated with the noises. Alternatively, or in addition, the code may detect a threshold complexity of the 3D progressive mesh based on number of triangles or vertices and display a simplification tool for a user to use to simplify the 3D progressive mesh. Alternatively, or in addition, the code may simplify the 3D progressive mesh by removing small particles. Alternatively, or in addition, the code may transform a vertex color detected from the 3D progressive mesh into a graphical texture file. Alternatively, or in addition, the code may repair the 3D progressive mesh during the generation of the 3D progressive mesh. Alternatively, or in addition, the code may detect and remove a phantom surface that is internal to a manifold surface of the 3D progressive mesh.

EXAMPLE 12

This example provides for a system for scanning and processing a three-dimensional (3D) object in color. The system includes a processor and a system memory including code to direct the processor. When executed this code can cause the processor to scan the 3D object to produce depth data. This code may also cause the processor to generate a 3D progressive mesh from the depth data. This code can also cause the processor to display the generation of the 3D progressive mesh in real-time. This code can also cause the processor to simplify the 3D progressive mesh by removing a detail of the 3D progressive mesh. Alternatively, or in addition, the code may improve color accuracy during the generation of the 3D progressive mesh by filtering noises in the depth data and removing inaccurate color artifacts associated with the noises. Alternatively, or in addition, the code may detect a threshold complexity of the 3D progressive mesh based on number of triangles or vertices and display a simplification tool for a user to use to simplify the 3D progressive mesh. Alternatively, or in addition, the code may simplify the 3D progressive mesh by removing small particles. Alternatively, or in addition, the code may transform a vertex color detected from the 3D progressive mesh into a graphical texture file. Alternatively, or in addition, the code may repair the 3D progressive mesh during the generation of the 3D progressive mesh. Alternatively, or in addition, the code may detect and remove a phantom surface that is internal to a manifold surface of the 3D progressive mesh.

EXAMPLE 13

This example provides for a system for scanning and processing a three-dimensional (3D) object in color. The system includes a processor and a system memory including code to direct the processor. When executed this code can cause the processor to scan the 3D object to produce depth data. This code may also cause the processor to generate a 3D progressive mesh from the depth data. This code can also cause the processor to display the generation of the 3D progressive mesh in real-time. This code can also cause the processor to reduce background noise during scanning by adjusting a capture depth volume. Alternatively, or in addition, the code may improve color accuracy during the generation of the 3D progressive mesh by filtering noises in the depth data and removing inaccurate color artifacts associated with the noises. Alternatively, or in addition, the code may detect a threshold complexity of the 3D progressive mesh based on number of triangles or vertices and display a simplification tool for a user to use to simplify the 3D progressive mesh. Alternatively, or in addition, the code may simplify the 3D progressive mesh by removing small particles. Alternatively, or in addition, the code may transform a vertex color detected from the 3D progressive mesh into a graphical texture file. Alternatively, or in addition, the code may repair the 3D progressive mesh during the generation of the 3D progressive mesh. Alternatively, or in addition, the code may detect and remove a phantom surface that is internal to a manifold surface of the 3D progressive mesh.

EXAMPLE 14

This example provides for a system for scanning and processing a three-dimensional (3D) object in color. The system includes a processor and a system memory including code to direct the processor. When executed this code can cause the processor to scan the 3D object to produce depth data. This code may also cause the processor to generate a 3D progressive mesh from the depth data. This code can also cause the processor to display the generation of the 3D progressive mesh in real-time. This code can also cause the processor to configure a capture volume size for scanning, the capture volume size to be smaller for a more detailed scan or larger for a less detailed scan. Alternatively, or in addition, the code may improve color accuracy during the generation of the 3D progressive mesh by filtering noises in the depth data and removing inaccurate color artifacts associated with the noises. Alternatively, or in addition, the code may detect a threshold complexity of the 3D progressive mesh based on number of triangles or vertices and display a simplification tool for a user to use to simplify the 3D progressive mesh. Alternatively, or in addition, the code may simplify the 3D progressive mesh by removing small particles. Alternatively, or in addition, the code may transform a vertex color detected from the 3D progressive mesh into a graphical texture file. Alternatively, or in addition, the code may repair the 3D progressive mesh during the generation of the 3D progressive mesh. Alternatively, or in addition, the code may detect and remove a phantom surface that is internal to a manifold surface of the 3D progressive mesh.

EXAMPLE 15

This example provides for a system for scanning and processing a three-dimensional (3D) object in color. The system includes a processor and a system memory including code to direct the processor. When executed this code can cause the processor to scan the 3D object to produce depth data. This code may also cause the processor to generate a 3D progressive mesh from the depth data. This code can also cause the processor to display the generation of the 3D progressive mesh in real-time. This code can also cause the processor to detect an opening in the 3D progressive mesh. This code can also cause the processor to repair the mesh such that the mesh represents a true volume. Alternatively, or in addition, the code may improve color accuracy during the generation of the 3D progressive mesh by filtering noises in the depth data and removing inaccurate color artifacts associated with the noises. Alternatively, or in addition, the code may detect a threshold complexity of the 3D progressive mesh based on number of triangles or vertices and display a simplification tool for a user to use to simplify the 3D progressive mesh. Alternatively, or in addition, the code may simplify the 3D progressive mesh by removing small particles. Alternatively, or in addition, the code may transform a vertex color detected from the 3D progressive mesh into a graphical texture file. Alternatively, or in addition, the code may repair the 3D progressive mesh during the generation of the 3D progressive mesh. Alternatively, or in addition, the code may detect and remove a phantom surface that is internal to a manifold surface of the 3D progressive mesh.

EXAMPLE 16

This example provides for a system for scanning and processing a three-dimensional (3D) object in color. The system includes a processor and a system memory including code to direct the processor. When executed this code can cause the processor to scan the 3D object to produce depth data. This code may also cause the processor to generate a 3D progressive mesh from the depth data. This code can also cause the processor to display the generation of the 3D progressive mesh in real-time. This code can also cause the processor to detect a non-manifold region of the 3D progressive mesh. This code can also cause the processor to repair the non-manifold region such that the 3D progressive mesh is manifold. Alternatively, or in addition, the code may improve color accuracy during the generation of the 3D progressive mesh by filtering noises in the depth data and removing inaccurate color artifacts associated with the noises. Alternatively, or in addition, the code may detect a threshold complexity of the 3D progressive mesh based on number of triangles or vertices and display a simplification tool for a user to use to simplify the 3D progressive mesh. Alternatively, or in addition, the code may simplify the 3D progressive mesh by removing small particles. Alternatively, or in addition, the code may transform a vertex color detected from the 3D progressive mesh into a graphical texture file. Alternatively, or in addition, the code may repair the 3D progressive mesh during the generation of the 3D progressive mesh. Alternatively, or in addition, the code may detect and remove a phantom surface that is internal to a manifold surface of the 3D progressive mesh.

EXAMPLE 17

This example provides for a method for scanning and processing a three-dimensional (3D) object in color. The method can include scanning the 3D object to produce depth data. Further the method may include generating, via a processor, a 3D progressive mesh from the depth data. The method can also include displaying the generation of the 3D progressive mesh in real-time. The method can also include removing a disconnected particle from the 3D progressive mesh or depth data. Alternatively, or in addition, the method may include improving color accuracy during the generation of the 3D progressive mesh by filtering noises in the depth data and removing inaccurate color artifacts associated with the noises. Alternatively, or in addition, the method may include simplifying the 3D progressive mesh by applying a smoothing filter. Alternatively, or in addition, the method may include simplifying the 3D progressive mesh by removing a section of the 3D progressive mesh. Alternatively, or in addition, the method may include simplifying the 3D progressive mesh by removing a detail of the 3D progressive mesh. Alternatively, or in addition, the method may include reducing background noise during scanning by adjusting a capture depth volume. Alternatively, or in addition, the method may include configuring a capture volume size for scanning, the capture volume size to be smaller for a more detailed scan or larger for a less detailed scan. Alternatively, or in addition, the method may include detecting an opening in the 3D progressive mesh and repairing the mesh such that the mesh represents a true volume. Alternatively, or in addition, the method may include detecting a non-manifold region of the 3D progressive mesh and repairing the non-manifold region such that the 3D progressive mesh is manifold. Alternatively, or in addition, the method may include repairing the 3D progressive mesh during the generation of the 3D progressive mesh. Alternatively, or in addition, the method may include detecting and removing a phantom surface that is internal to a manifold surface of the 3D progressive mesh.

EXAMPLE 18

This example provides for a method for scanning and processing a three-dimensional (3D) object in color. The method can include scanning the 3D object to produce depth data. Further the method may include generating, via a processor, a 3D progressive mesh from the depth data. The method can also include displaying the generation of the 3D progressive mesh in real-time. The method can also include simplifying the 3D progressive mesh by applying a smoothing filter. Alternatively, or in addition, the method may include improving color accuracy during the generation of the 3D progressive mesh by filtering noises in the depth data and removing inaccurate color artifacts associated with the noises. Alternatively, or in addition, the method may include removing a disconnected particle from the 3D progressive mesh or depth data. Alternatively, or in addition, the method may include simplifying the 3D progressive mesh by removing a section of the 3D progressive mesh. Alternatively, or in addition, the method may include simplifying the 3D progressive mesh by removing a detail of the 3D progressive mesh. Alternatively, or in addition, the method may include reducing background noise during scanning by adjusting a capture depth volume. Alternatively, or in addition, the method may include configuring a capture volume size for scanning, the capture volume size to be smaller for a more detailed scan or larger for a less detailed scan. Alternatively, or in addition, the method may include detecting an opening in the 3D progressive mesh and repairing the mesh such that the mesh represents a true volume. Alternatively, or in addition, the method may include detecting a non-manifold region of the 3D progressive mesh and repairing the non-manifold region such that the 3D progressive mesh is manifold. Alternatively, or in addition, the method may include repairing the 3D progressive mesh during the generation of the 3D progressive mesh. Alternatively, or in addition, the method may include detecting and removing a phantom surface that is internal to a manifold surface of the 3D progressive mesh.

EXAMPLE 19

This example provides for a method for scanning and processing a three-dimensional (3D) object in color. The method can include scanning the 3D object to produce depth data. Further the method may include generating, via a processor, a 3D progressive mesh from the depth data. The method can also include displaying the generation of the 3D progressive mesh in real-time. The method can also include simplifying the 3D progressive mesh by removing a section of the 3D progressive mesh. Alternatively, or in addition, the method may include improving color accuracy during the generation of the 3D progressive mesh by filtering noises in the depth data and removing inaccurate color artifacts associated with the noises. Alternatively, or in addition, the method may include removing a disconnected particle from the 3D progressive mesh or depth data. Alternatively, or in addition, the method may include simplifying the 3D progressive mesh by applying a smoothing filter. Alternatively, or in addition, the method may include simplifying the 3D progressive mesh by removing a detail of the 3D progressive mesh. Alternatively, or in addition, the method may include reducing background noise during scanning by adjusting a capture depth volume. Alternatively, or in addition, the method may include configuring a capture volume size for scanning, the capture volume size to be smaller for a more detailed scan or larger for a less detailed scan. Alternatively, or in addition, the method may include detecting an opening in the 3D progressive mesh and repairing the mesh such that the mesh represents a true volume. Alternatively, or in addition, the method may include detecting a non-manifold region of the 3D progressive mesh and repairing the non-manifold region such that the 3D progressive mesh is manifold. Alternatively, or in addition, the method may include repairing the 3D progressive mesh during the generation of the 3D progressive mesh. Alternatively, or in addition, the method may include detecting and removing a phantom surface that is internal to a manifold surface of the 3D progressive mesh.

EXAMPLE 20

This example provides for a method for scanning and processing a three-dimensional (3D) object in color. The method can include scanning the 3D object to produce depth data. Further the method may include generating, via a processor, a 3D progressive mesh from the depth data. The method can also include displaying the generation of the 3D progressive mesh in real-time. The method can also include simplifying the 3D progressive mesh by removing a detail of the 3D progressive mesh. Alternatively, or in addition, the method may include improving color accuracy during the generation of the 3D progressive mesh by filtering noises in the depth data and removing inaccurate color artifacts associated with the noises. Alternatively, or in addition, the method may include removing a disconnected particle from the 3D progressive mesh or depth data. Alternatively, or in addition, the method may include simplifying the 3D progressive mesh by applying a smoothing filter. Alternatively, or in addition, the method may include simplifying the 3D progressive mesh by removing a section of the 3D progressive mesh. Alternatively, or in addition, the method may include reducing background noise during scanning by adjusting a capture depth volume. Alternatively, or in addition, the method may include configuring a capture volume size for scanning, the capture volume size to be smaller for a more detailed scan or larger for a less detailed scan. Alternatively, or in addition, the method may include detecting an opening in the 3D progressive mesh and repairing the mesh such that the mesh represents a true volume. Alternatively, or in addition, the method may include detecting a non-manifold region of the 3D progressive mesh and repairing the non-manifold region such that the 3D progressive mesh is manifold. Alternatively, or in addition, the method may include repairing the 3D progressive mesh during the generation of the 3D progressive mesh. Alternatively, or in addition, the method may include detecting and removing a phantom surface that is internal to a manifold surface of the 3D progressive mesh.

EXAMPLE 21

This example provides for a method for scanning and processing a three-dimensional (3D) object in color. The method can include scanning the 3D object to produce depth data. Further the method may include generating, via a processor, a 3D progressive mesh from the depth data. The method can also include displaying the generation of the 3D progressive mesh in real-time. The method can also include reducing background noise during scanning by adjusting a capture depth volume. Alternatively, or in addition, the method may include improving color accuracy during the generation of the 3D progressive mesh by filtering noises in the depth data and removing inaccurate color artifacts associated with the noises. Alternatively, or in addition, the method may include removing a disconnected particle from the 3D progressive mesh or depth data. Alternatively, or in addition, the method may include simplifying the 3D progressive mesh by applying a smoothing filter. Alternatively, or in addition, the method may include simplifying the 3D progressive mesh by removing a section of the 3D progressive mesh. Alternatively, or in addition, the method may include simplifying the 3D progressive mesh by removing a detail of the 3D progressive mesh. Alternatively, or in addition, the method may include configuring a capture volume size for scanning, the capture volume size to be smaller for a more detailed scan or larger for a less detailed scan. Alternatively, or in addition, the method may include detecting an opening in the 3D progressive mesh and repairing the mesh such that the mesh represents a true volume. Alternatively, or in addition, the method may include detecting a non-manifold region of the 3D progressive mesh and repairing the non-manifold region such that the 3D progressive mesh is manifold. Alternatively, or in addition, the method may include repairing the 3D progressive mesh during the generation of the 3D progressive mesh. Alternatively, or in addition, the method may include detecting and removing a phantom surface that is internal to a manifold surface of the 3D progressive mesh.

EXAMPLE 22

This example provides for a method for scanning and processing a three-dimensional (3D) object in color. The method can include scanning the 3D object to produce depth data. Further the method may include generating, via a processor, a 3D progressive mesh from the depth data. The method can also include displaying the generation of the 3D progressive mesh in real-time. The method can also include configuring a capture volume size for scanning, the capture volume size to be smaller for a more detailed scan or larger for a less detailed scan. Alternatively, or in addition, the method may include improving color accuracy during the generation of the 3D progressive mesh by filtering noises in the depth data and removing inaccurate color artifacts associated with the noises. Alternatively, or in addition, the method may include removing a disconnected particle from the 3D progressive mesh or depth data. Alternatively, or in addition, the method may include simplifying the 3D progressive mesh by applying a smoothing filter. Alternatively, or in addition, the method may include simplifying the 3D progressive mesh by removing a section of the 3D progressive mesh. Alternatively, or in addition, the method may include simplifying the 3D progressive mesh by removing a detail of the 3D progressive mesh. Alternatively, or in addition, the method may include reducing background noise during scanning by adjusting a capture depth volume. Alternatively, or in addition, the method may include detecting an opening in the 3D progressive mesh and repairing the mesh such that the mesh represents a true volume. Alternatively, or in addition, the method may include detecting a non-manifold region of the 3D progressive mesh and repairing the non-manifold region such that the 3D progressive mesh is manifold. Alternatively, or in addition, the method may include repairing the 3D progressive mesh during the generation of the 3D progressive mesh. Alternatively, or in addition, the method may include detecting and removing a phantom surface that is internal to a manifold surface of the 3D progressive mesh.

EXAMPLE 23

This example provides for a method for scanning and processing a three-dimensional (3D) object in color. The method can include scanning the 3D object to produce depth data. Further the method may include generating, via a processor, a 3D progressive mesh from the depth data. The method can also include displaying the generation of the 3D progressive mesh in real-time. The method can also include detecting an opening in the 3D progressive mesh and repairing the mesh such that the mesh represents a true volume. Alternatively, or in addition, the method may include improving color accuracy during the generation of the 3D progressive mesh by filtering noises in the depth data and removing inaccurate color artifacts associated with the noises. Alternatively, or in addition, the method may include removing a disconnected particle from the 3D progressive mesh or depth data. Alternatively, or in addition, the method may include simplifying the 3D progressive mesh by applying a smoothing filter. Alternatively, or in addition, the method may include simplifying the 3D progressive mesh by removing a section of the 3D progressive mesh. Alternatively, or in addition, the method may include simplifying the 3D progressive mesh by removing a detail of the 3D progressive mesh. Alternatively, or in addition, the method may include reducing background noise during scanning by adjusting a capture depth volume. Alternatively, or in addition, the method may include configuring a capture volume size for scanning, the capture volume size to be smaller for a more detailed scan or larger for a less detailed scan. Alternatively, or in addition, the method may include detecting a non-manifold region of the 3D progressive mesh and repairing the non-manifold region such that the 3D progressive mesh is manifold. Alternatively, or in addition, the method may include repairing the 3D progressive mesh during the generation of the 3D progressive mesh. Alternatively, or in addition, the method may include detecting and removing a phantom surface that is internal to a manifold surface of the 3D progressive mesh.

EXAMPLE 24

This example provides for a method for scanning and processing a three-dimensional (3D) object in color. The method can include scanning the 3D object to produce depth data. Further the method may include generating, via a processor, a 3D progressive mesh from the depth data. The method can also include displaying the generation of the 3D progressive mesh in real-time. The method can also include improving color accuracy during the generation of the 3D progressive mesh by filtering noises in the depth data and removing inaccurate color artifacts associated with the noises. Alternatively, or in addition, the method may include removing a disconnected particle from the 3D progressive mesh or depth data. Alternatively, or in addition, the method may include simplifying the 3D progressive mesh by applying a smoothing filter. Alternatively, or in addition, the method may include simplifying the 3D progressive mesh by removing a section of the 3D progressive mesh. Alternatively, or in addition, the method may include simplifying the 3D progressive mesh by removing a detail of the 3D progressive mesh. Alternatively, or in addition, the method may include reducing background noise during scanning by adjusting a capture depth volume. Alternatively, or in addition, the method may include configuring a capture volume size for scanning, the capture volume size to be smaller for a more detailed scan or larger for a less detailed scan. Alternatively, or in addition, the method may include detecting an opening in the 3D progressive mesh and repairing the mesh such that the mesh represents a true volume. Alternatively, or in addition, the method may include detecting a non-manifold region of the 3D progressive mesh and repairing the non-manifold region such that the 3D progressive mesh is manifold. Alternatively, or in addition, the method may include repairing the 3D progressive mesh during the generation of the 3D progressive mesh. Alternatively, or in addition, the method may include detecting and removing a phantom surface that is internal to a manifold surface of the 3D progressive mesh.

EXAMPLE 25

This example provides for a method for scanning and processing a three-dimensional (3D) object in color. The method can include scanning the 3D object to produce depth data. Further the method may include generating, via a processor, a 3D progressive mesh from the depth data. The method can also include displaying the generation of the 3D progressive mesh in real-time. The method can also include detecting a non-manifold region of the 3D progressive mesh and repairing the non-manifold region such that the 3D progressive mesh is manifold. Alternatively, or in addition, the method may include improving color accuracy during the generation of the 3D progressive mesh by filtering noises in the depth data and removing inaccurate color artifacts associated with the noises. Alternatively, or in addition, the method may include removing a disconnected particle from the 3D progressive mesh or depth data. Alternatively, or in addition, the method may include simplifying the 3D progressive mesh by applying a smoothing filter. Alternatively, or in addition, the method may include simplifying the 3D progressive mesh by removing a section of the 3D progressive mesh. Alternatively, or in addition, the method may include simplifying the 3D progressive mesh by removing a detail of the 3D progressive mesh. Alternatively, or in addition, the method may include reducing background noise during scanning by adjusting a capture depth volume. Alternatively, or in addition, the method may include configuring a capture volume size for scanning, the capture volume size to be smaller for a more detailed scan or larger for a less detailed scan. Alternatively, or in addition, the method may include detecting an opening in the 3D progressive mesh and repairing the mesh such that the mesh represents a true volume. Alternatively, or in addition, the method may include repairing the 3D progressive mesh during the generation of the 3D progressive mesh. Alternatively, or in addition, the method may include detecting and removing a phantom surface that is internal to a manifold surface of the 3D progressive mesh.

EXAMPLE 26

This example provides for one or more computer-readable storage medium for storing computer readable instructions that, when executed by one or more processing devices, instruct the scanning and processing of a 3D object. The computer-readable medium include instructions to scan the 3D object to produce depth data. The computer-readable medium also include instructions to generate, via a processor, a 3D progressive mesh from the depth data. The computer-readable medium include instructions to display the generation of the 3D progressive mesh in real-time. Further, the computer-readable medium include instructions to print the 3D object. The computer-readable medium include instructions to transform a vertex color detected from the 3D progressive mesh into a graphical texture file. Alternatively, or in addition, the instructions remove a disconnected particle from the 3D progressive mesh or depth data. Alternatively, or in addition, the instructions may simplify the 3D progressive mesh by applying a smoothing filter. Alternatively, or in addition, the instructions may simplify the 3D progressive mesh by removing a section of the 3D progressive mesh. Alternatively, or in addition, the instructions may simplify the 3D progressive mesh by removing a detail of the 3D progressive mesh. Alternatively, or in addition, the instructions may reduce background noise during scanning by adjusting a capture depth volume. Alternatively, or in addition, the instructions may configure a capture volume size for scanning, the capture volume size to be smaller for a more detailed scan or larger for a less detailed scan. Alternatively, or in addition, the instructions may detect a threshold complexity of the 3D progressive mesh based on number of triangles or vertices and display a simplification tool for a user to use to simplify the 3D progressive mesh. Alternatively, or in addition, the instructions may repair the 3D progressive mesh during the generation of the 3D progressive mesh. Alternatively, or in addition, the instructions may detect and remove a phantom surface that is internal to a manifold surface of the 3D progressive mesh.

EXAMPLE 27

This example provides for one or more computer-readable storage medium for storing computer readable instructions that, when executed by one or more processing devices, instruct the scanning and processing of a 3D object. The computer-readable medium include instructions to scan the 3D object to produce depth data. The computer-readable medium also include instructions to generate, via a processor, a 3D progressive mesh from the depth data. The computer-readable medium include instructions to display the generation of the 3D progressive mesh in real-time. Further, the computer-readable medium include instructions to print the 3D object. The computer-readable medium include instructions to remove a disconnected particle from the 3D progressive mesh or depth data. Alternatively, or in addition, the instructions transform a vertex color detected from the 3D progressive mesh into a graphical texture file. Alternatively, or in addition, the instructions may simplify the 3D progressive mesh by applying a smoothing filter. Alternatively, or in addition, the instructions may simplify the 3D progressive mesh by removing a section of the 3D progressive mesh. Alternatively, or in addition, the instructions may simplify the 3D progressive mesh by removing a detail of the 3D progressive mesh. Alternatively, or in addition, the instructions may reduce background noise during scanning by adjusting a capture depth volume. Alternatively, or in addition, the instructions may configure a capture volume size for scanning, the capture volume size to be smaller for a more detailed scan or larger for a less detailed scan. Alternatively, or in addition, the instructions may detect a threshold complexity of the 3D progressive mesh based on number of triangles or vertices and display a simplification tool for a user to use to simplify the 3D progressive mesh. Alternatively, or in addition, the instructions may repair the 3D progressive mesh during the generation of the 3D progressive mesh. Alternatively, or in addition, the instructions may detect and remove a phantom surface that is internal to a manifold surface of the 3D progressive mesh.

EXAMPLE 28

This example provides for one or more computer-readable storage medium for storing computer readable instructions that, when executed by one or more processing devices, instruct the scanning and processing of a 3D object. The computer-readable medium include instructions to scan the 3D object to produce depth data. The computer-readable medium also include instructions to generate, via a processor, a 3D progressive mesh from the depth data. The computer-readable medium include instructions to display the generation of the 3D progressive mesh in real-time. Further, the computer-readable medium include instructions to print the 3D object. The computer-readable medium include instructions to simplify the 3D progressive mesh by applying a smoothing filter. The computer-readable medium include instructions to simplify the 3D progressive mesh by removing a section of the 3D progressive mesh. The computer-readable medium include instructions to simplify the 3D progressive mesh by removing a detail of the 3D progressive mesh. Alternatively, or in addition, the instructions transform a vertex color detected from the 3D progressive mesh into a graphical texture file. Alternatively, or in addition, the instructions remove a disconnected particle from the 3D progressive mesh or depth data. Alternatively, or in addition, the instructions may reduce background noise during scanning by adjusting a capture depth volume. Alternatively, or in addition, the instructions may configure a capture volume size for scanning, the capture volume size to be smaller for a more detailed scan or larger for a less detailed scan. Alternatively, or in addition, the instructions may detect a threshold complexity of the 3D progressive mesh based on number of triangles or vertices and display a simplification tool for a user to use to simplify the 3D progressive mesh. Alternatively, or in addition, the instructions may repair the 3D progressive mesh during the generation of the 3D progressive mesh. Alternatively, or in addition, the instructions may detect and remove a phantom surface that is internal to a manifold surface of the 3D progressive mesh.

EXAMPLE 29

This example provides for one or more computer-readable storage medium for storing computer readable instructions that, when executed by one or more processing devices, instruct the scanning and processing of a 3D object. The computer-readable medium include instructions to scan the 3D object to produce depth data. The computer-readable medium also include instructions to generate, via a processor, a 3D progressive mesh from the depth data. The computer-readable medium include instructions to display the generation of the 3D progressive mesh in real-time. Further, the computer-readable medium include instructions to print the 3D object. The computer-readable medium include instructions to reduce background noise during scanning by adjusting a capture depth volume. Alternatively, or in addition, the instructions transform a vertex color detected from the 3D progressive mesh into a graphical texture file. Alternatively, or in addition, the instructions remove a disconnected particle from the 3D progressive mesh or depth data. Alternatively, or in addition, the instructions may simplify the 3D progressive mesh by applying a smoothing filter. Alternatively, or in addition, the instructions may simplify the 3D progressive mesh by removing a section of the 3D progressive mesh. Alternatively, or in addition, the instructions may simplify the 3D progressive mesh by removing a detail of the 3D progressive mesh. Alternatively, or in addition, the instructions may configure a capture volume size for scanning, the capture volume size to be smaller for a more detailed scan or larger for a less detailed scan. Alternatively, or in addition, the instructions may detect a threshold complexity of the 3D progressive mesh based on number of triangles or vertices and display a simplification tool for a user to use to simplify the 3D progressive mesh. Alternatively, or in addition, the instructions may repair the 3D progressive mesh during the generation of the 3D progressive mesh. Alternatively, or in addition, the instructions may detect and remove a phantom surface that is internal to a manifold surface of the 3D progressive mesh.

EXAMPLE 30

This example provides for one or more computer-readable storage medium for storing computer readable instructions that, when executed by one or more processing devices, instruct the scanning and processing of a 3D object. The computer-readable medium include instructions to scan the 3D object to produce depth data. The computer-readable medium also include instructions to generate, via a processor, a 3D progressive mesh from the depth data. The computer-readable medium include instructions to display the generation of the 3D progressive mesh in real-time. Further, the computer-readable medium include instructions to print the 3D object. The computer-readable medium include instructions to configure a capture volume size for scanning, the capture volume size to be smaller for a more detailed scan or larger for a less detailed scan. Alternatively, or in addition, the instructions transform a vertex color detected from the 3D progressive mesh into a graphical texture file. Alternatively, or in addition, the instructions remove a disconnected particle from the 3D progressive mesh or depth data. Alternatively, or in addition, the instructions may simplify the 3D progressive mesh by applying a smoothing filter. Alternatively, or in addition, the instructions may simplify the 3D progressive mesh by removing a section of the 3D progressive mesh. Alternatively, or in addition, the instructions may simplify the 3D progressive mesh by removing a detail of the 3D progressive mesh. Alternatively, or in addition, the instructions may reduce background noise during scanning by adjusting a capture depth volume. Alternatively, or in addition, the instructions may detect a threshold complexity of the 3D progressive mesh based on number of triangles or vertices and display a simplification tool for a user to use to simplify the 3D progressive mesh. Alternatively, or in addition, the instructions may repair the 3D progressive mesh during the generation of the 3D progressive mesh. Alternatively, or in addition, the instructions may detect and remove a phantom surface that is internal to a manifold surface of the 3D progressive mesh.

EXAMPLE 31

This example provides for one or more computer-readable storage medium for storing computer readable instructions that, when executed by one or more processing devices, instruct the scanning and processing of a 3D object. The computer-readable medium include instructions to scan the 3D object to produce depth data. The computer-readable medium also include instructions to generate, via a processor, a 3D progressive mesh from the depth data. The computer-readable medium include instructions to display the generation of the 3D progressive mesh in real-time. Further, the computer-readable medium include instructions to print the 3D object. The computer-readable medium include instructions to detect a threshold complexity of the 3D progressive mesh based on number of triangles or vertices and display a simplification tool for a user to use to simplify the 3D progressive mesh. Alternatively, or in addition, the instructions transform a vertex color detected from the 3D progressive mesh into a graphical texture file. Alternatively, or in addition, the instructions remove a disconnected particle from the 3D progressive mesh or depth data. Alternatively, or in addition, the instructions may simplify the 3D progressive mesh by applying a smoothing filter. Alternatively, or in addition, the instructions may simplify the 3D progressive mesh by removing a section of the 3D progressive mesh. Alternatively, or in addition, the instructions may simplify the 3D progressive mesh by removing a detail of the 3D progressive mesh. Alternatively, or in addition, the instructions may reduce background noise during scanning by adjusting a capture depth volume. Alternatively, or in addition, the instructions may configure a capture volume size for scanning, the capture volume size to be smaller for a more detailed scan or larger for a less detailed scan. Alternatively, or in addition, the instructions may repair the 3D progressive mesh during the generation of the 3D progressive mesh. Alternatively, or in addition, the instructions may detect and remove a phantom surface that is internal to a manifold surface of the 3D progressive mesh.

EXAMPLE 32

This example provides for one or more computer-readable storage medium for storing computer readable instructions that, when executed by one or more processing devices, instruct the scanning and processing of a 3D object. The computer-readable medium include instructions to scan the 3D object to produce depth data. The computer-readable medium also include instructions to generate, via a processor, a 3D progressive mesh from the depth data. The computer-readable medium include instructions to display the generation of the 3D progressive mesh in real-time. Further, the computer-readable medium include instructions to print the 3D object. The computer-readable medium include instructions to improve color accuracy during the generation of the 3D progressive mesh by filtering noises in the depth data and removing inaccurate color artifacts associated with the noises. Alternatively, or in addition, the instructions transform a vertex color detected from the 3D progressive mesh into a graphical texture file. Alternatively, or in addition, the instructions remove a disconnected particle from the 3D progressive mesh or depth data. Alternatively, or in addition, the instructions may simplify the 3D progressive mesh by applying a smoothing filter. Alternatively, or in addition, the instructions may simplify the 3D progressive mesh by removing a section of the 3D progressive mesh. Alternatively, or in addition, the instructions may simplify the 3D progressive mesh by removing a detail of the 3D progressive mesh. Alternatively, or in addition, the instructions may reduce background noise during scanning by adjusting a capture depth volume. Alternatively, or in addition, the instructions may configure a capture volume size for scanning, the capture volume size to be smaller for a more detailed scan or larger for a less detailed scan. Alternatively, or in addition, the instructions may detect a threshold complexity of the 3D progressive mesh based on number of triangles or vertices and display a simplification tool for a user to use to simplify the 3D progressive mesh. Alternatively, or in addition, the instructions may repair the 3D progressive mesh during the generation of the 3D progressive mesh. Alternatively, or in addition, the instructions may detect and remove a phantom surface that is internal to a manifold surface of the 3D progressive mesh.

EXAMPLE 33

This example provides for one or more computer-readable storage medium for storing computer readable instructions that, when executed by one or more processing devices, instruct the scanning and processing of a 3D object. The computer-readable medium include instructions to scan the 3D object to produce depth data. The computer-readable medium also include instructions to generate, via a processor, a 3D progressive mesh from the depth data. The computer-readable medium include instructions to display the generation of the 3D progressive mesh in real-time. Further, the computer-readable medium include instructions to print the 3D object. The computer-readable medium include instructions to repair the 3D progressive mesh during the generation of the 3D progressive mesh. Alternatively, or in addition, the instructions transform a vertex color detected from the 3D progressive mesh into a graphical texture file. Alternatively, or in addition, the instructions remove a disconnected particle from the 3D progressive mesh or depth data. Alternatively, or in addition, the instructions may simplify the 3D progressive mesh by applying a smoothing filter. Alternatively, or in addition, the instructions may simplify the 3D progressive mesh by removing a section of the 3D progressive mesh. Alternatively, or in addition, the instructions may simplify the 3D progressive mesh by removing a detail of the 3D progressive mesh. Alternatively, or in addition, the instructions may reduce background noise during scanning by adjusting a capture depth volume. Alternatively, or in addition, the instructions may configure a capture volume size for scanning, the capture volume size to be smaller for a more detailed scan or larger for a less detailed scan. Alternatively, or in addition, the instructions may detect a threshold complexity of the 3D progressive mesh based on number of triangles or vertices and display a simplification tool for a user to use to simplify the 3D progressive mesh. Alternatively, or in addition, the instructions may detect and remove a phantom surface that is internal to a manifold surface of the 3D progressive mesh.

EXAMPLE 34

This example provides for a system for scanning and processing a 3D object in color. The system includes a processor and a system memory including code to direct the processor. When executed this code can cause the processor to scan the 3D object to produce depth data. This code may also cause the processor to generate a 3D progressive mesh from the depth data. This code can also cause the processor to display the generation of the 3D progressive mesh in real-time. This code can also cause the processor to repair the 3D progressive mesh during the generation of the 3D progressive mesh. Alternatively, or in addition, the code may improve color accuracy during the generation of the 3D progressive mesh by filtering noises in the depth data and removing inaccurate color artifacts associated with the noises. Alternatively, or in addition, the code may detect a threshold complexity of the 3D progressive mesh based on number of triangles or vertices and display a simplification tool for a user to use to simplify the 3D progressive mesh. Alternatively, or in addition, the code may simplify the 3D progressive mesh by removing small particles. Alternatively, or in addition, the code may transform a vertex color detected from the 3D progressive mesh into a graphical texture file. Alternatively, or in addition, the code may detect and remove a phantom surface that is internal to a manifold surface of the 3D progressive mesh.

EXAMPLE 35

This example provides for a method for scanning and processing a 3D object in color. The method can include scanning the 3D object to produce depth data. Further the method may include generating, via a processor, a 3D progressive mesh from the depth data. The method can also include displaying the generation of the 3D progressive mesh in real-time. The method can also include repairing the 3D progressive mesh during the generation of the 3D progressive mesh. Alternatively, or in addition, the method may include improving color accuracy during the generation of the 3D progressive mesh by filtering noises in the depth data and removing inaccurate color artifacts associated with the noises. Alternatively, or in addition, the method may include removing disconnected particles from the 3D progressive mesh or depth data. Alternatively, or in addition, the method may include simplifying the 3D progressive mesh by applying a smoothing filter. Alternatively, or in addition, the method may include simplifying the 3D progressive mesh by removing a section of the 3D progressive mesh. Alternatively, or in addition, the method may include simplifying the 3D progressive mesh by removing a detail of the 3D progressive mesh. Alternatively, or in addition, the method may include reducing background noise during scanning by adjusting a capture depth volume. Alternatively, or in addition, the method may include configuring a capture volume size for scanning, the capture volume size to be smaller for a more detailed scan or larger for a less detailed scan. Alternatively, or in addition, the method may include detecting an opening in the 3D progressive mesh and repairing the mesh such that the mesh represents a true volume. Alternatively, or in addition, the method may include detecting a non-manifold region of the 3D progressive mesh and repairing the non-manifold region such that the 3D progressive mesh is manifold. Alternatively, or in addition, the method may include detecting and removing a phantom surface that is internal to a manifold surface of the 3D progressive mesh.

EXAMPLE 36

This example provides for a system for scanning and processing a 3D object in color. The system includes a processor and a system memory including code to direct the processor. When executed this code can cause the processor to scan the 3D object to produce depth data. This code may also cause the processor to generate a 3D progressive mesh from the depth data. This code can also cause the processor to display the generation of the 3D progressive mesh in real-time. This code may also cause the processor to detect and remove a phantom surface that is internal to a manifold surface of the 3D progressive mesh. Alternatively, or in addition, the code may improve color accuracy during the generation of the 3D progressive mesh by filtering noises in the depth data and removing inaccurate color artifacts associated with the noises. Alternatively, or in addition, the code may detect a threshold complexity of the 3D progressive mesh based on number of triangles or vertices and display a simplification tool for a user to use to simplify the 3D progressive mesh. Alternatively, or in addition, the code may simplify the 3D progressive mesh by removing small particles. Alternatively, or in addition, the code may transform a vertex color detected from the 3D progressive mesh into a graphical texture file. Alternatively, or in addition, the code may repair the 3D progressive mesh during the generation of the 3D progressive mesh.

EXAMPLE 37

This example provides for a method for scanning and processing a 3D object in color. The method can include scanning the 3D object to produce depth data. Further the method may include generating, via a processor, a 3D progressive mesh from the depth data. The method can also include displaying the generation of the 3D progressive mesh in real-time. The method can also include detecting and removing a phantom surface that is internal to a manifold surface of the 3D progressive mesh. Alternatively, or in addition, the method may include improving color accuracy during the generation of the 3D progressive mesh by filtering noises in the depth data and removing inaccurate color artifacts associated with the noises. Alternatively, or in addition, the method may include removing disconnected particles from the 3D progressive mesh or depth data. Alternatively, or in addition, the method may include simplifying the 3D progressive mesh by applying a smoothing filter. Alternatively, or in addition, the method may include simplifying the 3D progressive mesh by removing a section of the 3D progressive mesh. Alternatively, or in addition, the method may include simplifying the 3D progressive mesh by removing a detail of the 3D progressive mesh. Alternatively, or in addition, the method may include reducing background noise during scanning by adjusting a capture depth volume. Alternatively, or in addition, the method may include configuring a capture volume size for scanning, the capture volume size to be smaller for a more detailed scan or larger for a less detailed scan. Alternatively, or in addition, the method may include detecting an opening in the 3D progressive mesh and repairing the mesh such that the mesh represents a true volume. Alternatively, or in addition, the method may include detecting a non-manifold region of the 3D progressive mesh and repairing the non-manifold region such that the 3D progressive mesh is manifold. Alternatively, or in addition, the method may include repairing the 3D progressive mesh during the generation of the 3D progressive mesh.

EXAMPLE 38

This example provides for one or more computer-readable storage medium for storing computer readable instructions that, when executed by one or more processing devices, instruct the scanning and processing of a 3D object. The computer-readable medium include instructions to scan the 3D object to produce depth data. The computer-readable medium also include instructions to generate, via a processor, a 3D progressive mesh from the depth data. The computer-readable medium include instructions to display the generation of the 3D progressive mesh in real-time. Further, the computer-readable medium include instructions to print the 3D object. Alternatively, or in addition, the instructions transform a vertex color detected from the 3D progressive mesh into a graphical texture file. The computer-readable medium include instructions to detect and remove a phantom surface that is internal to a manifold surface of the 3D progressive mesh. Alternatively, or in addition, the instructions remove disconnected particles from the 3D progressive mesh or depth data. Alternatively, or in addition, the instructions may simplify the 3D progressive mesh by applying a smoothing filter. Alternatively, or in addition, the instructions may simplify the 3D progressive mesh by removing a section of the 3D progressive mesh. Alternatively, or in addition, the instructions may simplify the 3D progressive mesh by removing a detail of the 3D progressive mesh. Alternatively, or in addition, the instructions may reduce background noise during scanning by adjusting a capture depth volume. Alternatively, or in addition, the instructions may configure a capture volume size for scanning, the capture volume size to be smaller for a more detailed scan or larger for a less detailed scan. Alternatively, or in addition, the instructions may detect a threshold complexity of the 3D progressive mesh based on number of triangles or vertices and display a simplification tool for a user to use to simplify the 3D progressive mesh. Alternatively, or in addition, the instructions may repair the 3D progressive mesh during the generation of the 3D progressive mesh.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for scanning and processing a three-dimensional (3D) object in color, comprising:
   a scanner to scan the 3D object to produce depth data; and
   a generator to generate a 3D progressive mesh from the depth data, the generation of the 3D progressive mesh to be displayed in real-time as the 3D object is being scanned; and
   an editor to:
      detect a non-manifold region of the 3D progressive mesh; and
      automatically fill a hole below a threshold size in the non-manifold region based on a plane or a curved surface corresponding to neighboring surfaces.

2. The system of claim 1, wherein the editor is to improve color accuracy during the generation of the 3D progressive mesh by filtering noises in the depth data and removing inaccurate color artifacts associated with the noises.

3. The system of claim 1, wherein the editor is to:
   detect a threshold complexity of the 3D progressive mesh based on a number of triangles or vertices; and
   display a simplification tool to simplify the 3D progressive mesh.

4. The system of claim 1, wherein the editor is to simplify the 3D progressive mesh by removing small particles.

5. The system of claim 1, wherein the editor is to transform a vertex color detected from the 3D progressive mesh into a graphical texture file.

6. A method for scanning and processing a three-dimensional (3D) object in color, the method comprising:
   scanning the 3D object to produce depth data;
   generating, via a processor, a 3D progressive mesh from the depth data;
   displaying the generation of the 3D progressive mesh in real-time as the 3D object is being scanned;
   detecting a non-manifold region of the 3D progressive mesh; and
   automatically filling a hole below a threshold size in the non-manifold region based on a plane or a curved surface corresponding to neighboring surfaces.

7. The method of claim 6, further comprising improving color accuracy during the generation of the 3D progressive mesh by filtering noises in the depth data and removing inaccurate color artifacts associated with the noises.

8. The method of claim 6, further comprising removing a disconnected particle from the 3D progressive mesh or the depth data.

9. The method of claim, 8 further comprising simplifying the 3D progressive mesh by applying a smoothing filter, removing a section of the 3D progressive mesh, removing a detail of the 3D progressive mesh, or any combination thereof.

10. The method of claim 6, further comprising reducing background noise during scanning by adjusting a capture depth volume.

11. The method of claim 6, further comprising configuring a capture volume size for scanning, the capture volume size to be smaller for a more detailed scan or larger for a less detailed scan.

12. The method of claim 6, further comprising:
detecting an opening in the 3D progressive mesh; and
repairing the 3D progressive mesh such that the 3D progressive mesh represents a true volume.

13. The method of claim 6, further comprising:
detecting a non-manifold region of the 3D progressive mesh; and
repairing the non-manifold region such that the 3D progressive mesh is manifold.

14. The method of claim 6, comprising receiving a threshold triangle size and removing triangles in the 3D progressive mesh below the threshold triangle size.

15. One or more computer-readable memory storage devices for storing computer readable instructions that, when executed by one or more processing devices, instruct the scanning and processing of a 3D object, the computer-readable instructions comprising code to:
scan the 3D object to produce depth data;
generate, via a processor, a 3D progressive mesh from the depth data;
display the generation of the 3D progressive mesh in real-time as the 3D object is being scanned;
detect a non-manifold region of the 3D progressive mesh;
automatically fill a hole below a threshold size in the non-manifold region based on a plane or a curved surface corresponding to neighboring surfaces; and
print the 3D object.

16. The one or more computer-readable memory storage devices of claim 15, the computer-readable instructions comprising code to transform a vertex color detected from the 3D progressive mesh into a graphical texture file.

17. The one or more computer-readable memory storage devices of claim 15, the computer-readable instructions comprising code to remove a disconnected particle from the 3D progressive mesh or the depth data.

18. The one or more computer-readable memory storage devices of claim 15, the computer-readable instructions comprising code to simplify the 3D progressive mesh by applying a smoothing filter, remove a section of the 3progressive mesh, remove a detail of the 3D progressive mesh, or any combination thereof.

19. The one or more computer-readable memory storage devices of claim 15, the computer-readable instructions comprising code to reduce background noise during scanning by adjusting a capture depth volume.

20. The one or more computer-readable memory storage devices of claim 15, the computer-readable instructions comprising code to configure a capture volume size for scanning, the capture volume size to be smaller for a more detailed scan or larger for a less detailed scan.

21. The one or more computer-readable memory storage devices of claim 20, the computer-readable instructions comprising code to:
detect a threshold complexity of the 3D progressive mesh based on number of triangles or vertices; and
display a simplification tool for a user to use to simplify the 3D progressive mesh.

* * * * *